(12) United States Patent
Moskowitz

(10) Patent No.: US 9,261,752 B2
(45) Date of Patent: Feb. 16, 2016

(54) ENHANCED FUNCTIONALITY OF SPD ELECTRONIC CONTROLLERS

(71) Applicant: SPD Control Systems Corporation, Stony Brook, NY (US)

(72) Inventor: Jay Moskowitz, Boynton Beach, FL (US)

(73) Assignee: SPD Control Systems Corporation, Stony Brook, NY (US)

( * ) Notice: Subject to any disclaimer, the term of this patent is extended or adjusted under 35 U.S.C. 154(b) by 0 days.

(21) Appl. No.: 14/308,225

(22) Filed: Jun. 18, 2014

(65) Prior Publication Data

US 2014/0333990 A1 Nov. 13, 2014

Related U.S. Application Data

(63) Continuation of application No. 13/337,344, filed on Dec. 27, 2011, now Pat. No. 8,792,154, which is a continuation of application No. 12/855,782, filed on Aug. 13, 2010, now Pat. No. 8,098,421, which is a (Continued)

(51) Int. Cl.
*G02B 26/00* (2006.01)
*G09G 3/34* (2006.01)

(Continued)

(52) U.S. Cl.
CPC . *G02F 1/167* (2013.01); *E06B 9/24* (2013.01); *G02F 1/0121* (2013.01); *G08C 17/02* (2013.01);

(Continued)

(58) Field of Classification Search
CPC .................................. G09G 3/344; G09F 9/372

USPC ............... 359/296; 345/107; 430/32; 204/600
See application file for complete search history.

(56) References Cited

U.S. PATENT DOCUMENTS 3,512,876 A 5/1970 Marks
3,892,482 A 7/1975 Weisglass
(Continued)

FOREIGN PATENT DOCUMENTS

JP 1990-161091 6/1990
JP 2-148124 12/1990
(Continued)

OTHER PUBLICATIONS

Extended European Search Report dated Jan. 19, 2015 for European Patent Application 06809272.5.
(Continued)

*Primary Examiner* — William Choi
(74) *Attorney, Agent, or Firm* — Oppedahl Patent Law Firm LLC

(57) ABSTRACT

A scalable apparatus and a network environment dynamically changes the light transparency of a single SPD device, a small number of SPD devices or thousands of such SPD devices installed in windows in automobiles, aircraft, trains, marine vehicles, residential homes, commercial buildings and skyscrapers. A scalable apparatus and a network environment dynamically changes the light transparency of a single SPD device or thousands of such SPD devices in the presentation of a multi-media special effects display. Textual messages, graphical images and simulated motion effects are driven. Such scalable apparatus being capable of driving and using several operational parameters of SPD's such as frequency range, AC voltage and temperature so as to provide fine control of SPD characteristics such as switching speed and power consumption.

13 Claims, 13 Drawing Sheets

Related U.S. Application Data continuation of application No. 11/530,310, filed on Sep. 8, 2006, now Pat. No. 7,800,812.

(60) Provisional application No. 60/597,162, filed on Nov. 14, 2005, provisional application No. 60/721,731, filed on Sep. 28, 2005, provisional application No. 60/596,198, filed on Sep. 8, 2005.

(51) Int. Cl.
*G02F 1/167* (2006.01)
*E06B 9/24* (2006.01)
*G02F 1/01* (2006.01)
*G08C 17/02* (2006.01)
*G02F 1/133* (2006.01)
*G02F 1/17* (2006.01)
*G06F 3/14* (2006.01)
*G06F 3/147* (2006.01)
*G09G 5/24* (2006.01)

(52) U.S. Cl.
CPC ..... *E06B 2009/2464* (2013.01); *G02F 1/13306* (2013.01); *G02F 1/172* (2013.01); *G06F 3/147* (2013.01); *G06F 3/1423* (2013.01); *G06F 3/1446* (2013.01); *G08C 2201/40* (2013.01); *G09G 5/24* (2013.01)

(56) References Cited

U.S. PATENT DOCUMENTS

| | | | |
|---|---|---|---|
| 3,892,485 | A | 7/1975 | Merritt |
| 4,284,417 | A | 8/1981 | Reese |
| 6,481,851 | B1 | 11/2002 | McNelley |
| 6,593,902 | B1 | 7/2003 | Ogino |
| 6,594,067 | B2 | 7/2003 | Poll |
| 6,710,797 | B1 | 3/2004 | McNelley |
| 6,795,226 | B2 | 9/2004 | Agrawal |
| 6,804,040 | B2 | 10/2004 | Malvino |
| 6,897,997 | B2 | 5/2005 | Malvino |
| 7,012,600 | B2 | 3/2006 | Zehner |
| 7,209,160 | B2 | 4/2007 | McNelley |
| 7,245,205 | B2 | 7/2007 | Strohband |
| 7,309,284 | B2 | 12/2007 | Griswold |
| 7,375,871 | B2 | 5/2008 | Libretto |
| 7,417,785 | B2 | 8/2008 | Malvino |
| 7,796,322 | B2 | 9/2010 | Ratti |
| 7,800,812 | B2 | 9/2010 | Moskowitz |
| 2004/0119681 | A1 | 6/2004 | Albert |
| 2005/0137754 | A1 | 6/2005 | Bartlett |
| 2005/0231336 | A1 | 10/2005 | Strohband |
| 2006/0107616 | A1 | 5/2006 | Ratti |
| 2007/0103763 | A1 | 5/2007 | Poll et al. |
| 2009/0262085 | A1 | 10/2009 | Wassingbo |
| 2010/0302624 | A1 | 12/2010 | Moskowitz |
| 2010/0308207 | A1 | 12/2010 | Moskowitz |
| 2010/0328757 | A1 | 12/2010 | Ratti |

FOREIGN PATENT DOCUMENTS

| | | |
|---|---|---|
| JP | 05-300069 | 11/1993 |
| JP | 1994-289434 | 10/1994 |
| JP | 08-036156 | 2/1996 |
| JP | 09-119272 | 5/1997 |
| JP | 2000-054762 | 2/2000 |
| JP | 2001-056387 | 2/2001 |
| JP | 2003-018667 | 1/2003 |
| KR | 1020040033210 | 4/2004 |
| WO | 9720437 | 6/1997 |
| WO | 02/08826 | 1/2002 |
| WO | 2004/077649 | 9/2004 |
| WO | 2007/029215 | 3/2007 |

OTHER PUBLICATIONS

International search report, mailed Mar. 26, 2007, in international application No. PCT/IB2006/053192 published as WO/2007/029215.
Written opinion, mailed Mar. 26, 2007, in international application No. PCT/IB2006/053192 published as WO/2007/029215.

ENHANCED FUNCTIONALITY OF SPD ELECTRONIC CONTROLLERS

CROSS-REFERENCE TO RELATED APPLICATIONS

This application is a continuation of U.S. application Ser. No. 13/337,344 filed Dec. 27, 2011, which is a continuation of U.S. application Ser. No. 12/855,782 filed Aug. 13, 2010, which is a continuation of U.S. application Ser. No. 11/530,310 filed Sep. 8, 2006, which in turn claims the benefit of U.S. application Nos. 60/596,198 filed Sep. 8, 2005, 60/721,731 filed Sep. 28, 2005, and 60/597,162 filed Nov. 14, 2005, each of which is incorporated herein by reference for all purposes.

BACKGROUND OF THE INVENTION

Light valves have been in use for more than sixty years for the modulation of light. As used herein, a light valve is defined as a cell formed of two walls that are spaced apart by a small distance, at least one wall being transparent, the walls having electrodes thereon, usually in the form of transparent, electrically conductive coatings. The cell contains a light-modulating element (sometimes herein referred to as an "activatable material"), which may be either a liquid suspension of particles, or a plastic film in which droplets of a liquid suspension of particles are distributed.

The liquid suspension (sometimes herein referred to as "a liquid light valve suspension" or "a light valve suspension") comprises small, anisotropically shaped particles suspended in a liquid suspending medium. In the absence of an applied electrical field, the particles in the liquid suspension assume random positions due to Brownian movement, and hence a beam of light passing into the cell is reflected, transmitted or absorbed, depending upon the cell structure, the nature and concentration of the particles, and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. Light valves of the type described herein are also known as "suspended particle devices" or "SPDs." More generally, the term suspended particle device, as used herein, refers to any device in which suspended particles align to allow light to pass through the device when an electric field is applied. Light valves have been proposed for use in numerous applications including windows, skylights, and sunroofs, to control the amount of light passing therethrough or reflected therefrom as the case may be. As used herein the term "light" generally refers to visible electromagnetic radiation, but where applicable, "light" can also comprise other types of electromagnetic radiation such as, but not limited to, infrared radiation and ultraviolet radiation.

The SPD is laminated between two pieces of glass or plastic to form a sandwich which is sometimes called SPD Glass or SPD Plastic, and which can be further used to form a glass or plastic window. With such SPDs forming a window, the amount of light passing through the window can be finely controlled based upon the characteristics of the electricity passing through the SPD. The degree to which something reduces the passage of electromagnetic radiation is known as opacity. When referring to windows, changes in opacity is often noted as a change in a windows tinting, its light transparency or transparency and each of these terms may be equally be used to mean the same.

Such SPDs are now being installed into glass so that the amount of light passing through the glass can be finely controlled based upon the characteristics of the electricity passing through the glass. At least one method by which such glass and thus its opacity or light transparency may be controlled is described by Malvino, in U.S. Pat. Nos. 6,897,997 and 6,804,040 collectively referred to as the Malvino patents. But a device envisioned by Malvino, while suitable for the manual control of a small number of co-located windows, is not scalable nor does it provide the automated intelligence to actively and dynamically control environments of more than a few windows such as in an automobile, marine vehicle, train or aircraft, to as much as a residential or commercial building or a skyscraper of such SPD windows.

The Malvino patents provide the basis for driving SPD glass by varying voltage at a fixed frequency which will cause the glass to lighten toward clear or to darken so as to block most light passing through it. That device is capable of mapping the non-linear characteristics of SPD into a linear range of values that could be thought of as setting the glass from say 0 to 100%. The range is broken down into a small discrete set of settings for perhaps 6 different opaqueness levels and 6 specific resistor and capacitor combinations are built into the implementation and are manually selected to set the proper voltage for the associated degree of tinting. Through that implementation, a linear manual control, such as a slide switch or a rotating dial may be attached to the Malvino controller to directly vary the amount of light allowed through the glass at any time.

The Malvino patents review the use of a few fixed frequencies at which to drive an SPD. As described, driving the device at a lower frequency tends to have a slight lower energy utilization curve with regard to the power needed to drive the SPD. Frequencies in the range of 15 hertz to 60 hertz were discussed. There is a serious potential problem with the aforementioned controller operating the SPD when driven by these frequencies. It is possible that the SPD will "sing" and be heard as a tone in the B-flat range by being driven by a fixed frequency within that range. An SPD controlled window typically consists of SPD-capable material in the form of a clear Mylar coated with SPD emulation, placed in between two pieces of glass. The SPD is basically sandwiched and held in place by glass on both sides. If 50/60 Hertz current travels through the sandwiched SPD, in some cases, the Mylar will start to vibrate in resonance with the driving frequency and may be heard by people near the window as an annoying hum.

A considerable issue in the wide-scale worldwide deployment of SPD windows, is on how residential and commercial buildings will be wired up to allow some "central intelligence" to operate the individual windows. Today, there is no concept of running wires to windows from some control room in the building. It is not desirable to introduce a new requirement for building wiring in the introduction of SPD glass around the world, since thousands of installation people would need to learn and understand new building wiring requirements. Yet, if any other techniques are employed to "wire" each window to the "central intelligence", it must require little or no training, and be a relatively low cost so as not to make the use of SPD glass prohibitive.

SUMMARY OF THE INVENTION

The invention relates to a wirelessly enabled apparatus and associated mesh networking software installed in large arrays in order to dynamically control the "skin" of residential and commercial buildings throughout the day in order to absorb or reflect sunlight in such a manner as to dramatically reduce the energy consumption of such buildings. The integration of a mesh network lowers the cost of deployment of such control by permitting the individual devices that control one or more windows, to act as a relay point in moving control signals from intelligent control points in a Building Skin Control System to the individual controllers or sets of controllers which will effect the desired changes. The invention further relates to a Suspended Particle Device control apparatus and associated network installed in large arrays in order to dynamically control the glass windows of residential and commercial buildings throughout the day in order to absorb or reflect sunlight in such a manner as to dramatically reduce the energy consumption of such buildings. The use of a hierarchical distribution system over a LAN or WAN reduces the time to transmit commands from a central intelligence point, the Master Building Control Point, to all window controllers in a structure to set individual windows to a specific level of opaqueness.

The device described herein corrects for the "singing" problem by providing the option of driving the SPD at a variable frequency in the low frequency range rather than a single fixed frequency. Optionally, in lieu of using a continuously variable SPD driving frequency, the Controller may randomly drop or phase shift several cycles per second. The change/shift is not enough to be visibly noticeable but it would eliminate the "ringing effect". As will be seen below, the system according to the invention scales from the single-window environment to a building with a size beyond that of the currently largest in the world, Taipei 101 in the Xin-Yi district of Taipei, with over 32,000 windows.

This invention provides for a range of SPD control far beyond that previously in existence. The "Scalable Controller" a.k.a. "SC" of this invention adds intelligence that greatly expands the capabilities of prior controllers. As in prior implementations, one to several pieces of glass may be controlled by a single controller, where several is a relatively small number such as 8 and each piece of glass is hardwired to the controller. The Scalable controller further supports a setup phase whereby the user may configure the relationship between manual external control or several individual manual controls and which window/windows are to be controlled from that manual setting. In a setting of four windows under the Scalable Controller, where the windows are referred to as A, B, C and D, a user may configure the SC so that windows AB are controlled as a single window and CD as another, or ABC is controlled as a single window and D as another, or ABCD is controlled as a single window or, AB CD are controlled as 4 separate windows.

This system coordinates the settings of each of the windows in a building in an intelligent manner from a central intelligence point known of the Master Building Control Point. It will make intelligent decisions based on many factors including real time events, as to the proper amount of visible light to permit to flow through each window in order to take best advantage of the solar heating effect.

Enhanced capabilities of the SC over prior inventions provide for full control of all operational parameters which effect the characteristics of a SPD. This type of control exists in each SC to optimize SPD performance by power utilization or switching speed potentially taking into account external temperature, while controlling the haze and clarity.

The flexibility of the SC and its networking capabilities also support the display of textual messages or special light tinting sequences as part of a multimedia presentation. Such a multimedia display could change windows along the facade of an office building in time to the changes in perhaps Christmas Music during the holiday period. A scaled-down version of such a system could provide for a moving textual display across small SPD pixels sitting in a box on a desktop. These diverse applications reflect the flexibility and importance of this invention.

BRIEF DESCRIPTION OF THE DRAWING

The invention will be described with respect to a drawing in several figures, of which.

DETAILED DESCRIPTION OF THE INVENTION

Figure 1:
FIG. 1 is a diagram showing an SPD window controller under manual adjustment from a single external device.

With the incorporation of a Microprocessor into the Scalable Controller, the capabilities and flexibility of the device are expanded dramatically for use both in a standalone environment as well as being a data point in a sea of such controllers which, under such intelligent control, can dynamically modify the skin of an office building to provide unprecedented control over its energy usage. Even in the standalone environment, the SC can be programmed with the intelligence to reduce energy usage in the room where it is being used. The SC may be put into an automatic mode instead of being under manual control and can operate as described below.

Although the same functions may be achieved in several ways, in the implementation described herein, the end user has the ability to set the latitude, longitude, window orientation from North, and window angle from vertical into a suitable data processing program. This program creates a profile that can be downloaded into the SC which uses the setup data to determine the location on the earth of the window(s) under control and thereby, for each window, its angle from the sun at any time of the day. A time/date clock operates in the SC to drive its window(s) based upon the time of day, day of year, and the location on the planet. At 1:00 PM on July 2nd in Manhattan, N.Y., the windows directly facing the sun would be set to the maximum opaqueness while those angled away from the sun would have reduced opaqueness and those on the opposite side of the building might be totally clear. As the sun crosses the sky, each window changes according to the built-in profile. Yet at 1:00 PM on July 2nd in Sydney Australia, those windows facing the sun will be clear, so that the building's heating system requirements may be reduced by utilizing the sun to heat windows directly facing the sun, while windows on the opposite side of the building would be turned dark so as to keep heat trapped in the building. A photocell connected to the SC will provide external sensor input so as to allow the SC to further fine tune the current opaqueness based upon current cloud and weather conditions. Sidereal information has been well known and calculable for centuries and may thus be profiled into the SC device itself. Weather conditions that might block the sun are random real-time events.

Although such Intelligent control permits several windows to operate autonomously, in a larger-scale implementation, it is desirable to put entire segments of building windows under a coordinated set of controls. In relatively large types of environments, rather than using a profile of individual windows, it is possible to perform more real-time data processing and to make more intelligent decisions of the opacity of every segment of a building at any point in time. The SC of this invention is capable of expanding so as to operate in such a mode.

This system virtually eliminates all building wiring issues to put all SPD windows under a central control. Each Scalable Controller is outfitted with a low-power, low-data-rate, limited-range, radio transceiver. These radio transceivers are capable of communicating on a point-to-point basis to one or more radio transceivers located within other Scalable Controllers in a 3-dimensional space around each controller. The SC microprocessor is further outfitted with mesh networking software. Such types of software have been in existence in various incarnations for a long period of time. The radio transceivers send specially formatted packets of data back and forth between each other. Some packets contain data which is used to operate the mesh network itself while other packets contain sensor data or window control information. Routing control packets are one type of mesh control packet which is sent. Each SC can be thought of as a "node" in the mesh network. The routing information is used to leave information at each individual node to indicate an available "route" to move data from a window controller to another intermediate window controller along a path to a "Hierarchical Control Point (HCP)" or from an HCP through intermediate window controllers on its way to a specific individual window controller. An HCP is the location of a special data processing node, as opposed to a window controller node, which is capable of coordinating the changing of the opaqueness of windows for some segment of a building. There may be several Office Control Points (OCP), Section Control Points (SCP), Region Control Points (RCP), Floor Control Points (FCP), Multi-floor Control Points (MCP) and a single Building Control Point (BCP) located in typical building environment. A single Control Point might exist in a small implementation while all types of Control Points may exist in a very large-scale implementation. The use of additional Control Points reduces communication overhead in the mesh network and decreases the time delay between the time a window opaqueness modification command is sent and when it is acted upon at individual windows. In this instantiation of the invention, any window SC can become a Control Point via a command sent from the Building Control Point. Although a Building Control Point is an Intelligent Data Processing System, the lower hierarchical control points have a relatively small set of fixed commands and operations which can easily be handled at the Microprocessor at any window SC. In the largest-scale implementation of the Scalable Controller Network, the BCP can inform the Multi-Floor Control Points (MCP) to change the settings of each window on all floors; the MCP will distribute this request to each of the FCP's; the FCP's will distribute the request to the RCP's; the RCP's will send the command to SCP's; and the SCP's will forward the commands to OCP's which will command each window controller in an office to execute the required change. Because of the expansion to multiple nodes at each level of the hierarchy, commands may be simultaneously sent within different non-overlapping areas of the network where they may pass through intermediate nodes with no or little queuing delay, thus having the request executed throughout the building in a seemingly simultaneous fashion.

Typically, a window controller is not in direct radio communication with the location in the building where a HCP might be located. But every window controller will typically be within radio communication of several other window controllers. The mesh networking software permits a data packet to be sent from a source node to any neighboring node that is along a path which eventually leads to the destination node, through a series of hops through intermediate nodes. Because of the multiple paths that exist between nodes, data can typically be routed around areas of the network that might be temporarily undergoing radio interference. Data retransmission and acknowledgments during point-to-point communications insure that data is not dropped by one node until the next node in the network has accepted the data being sent. If such acknowledgment is not received, a node may send its data onto an alternate path to the destination. If a segment of the radio network should become isolated, a packet hop count insures that packets which will never reach their ultimate destination are eliminated from the network. End-to-end acknowledgments let the source and destination nodes recognize when data must be retransmitted in its entirety because it may have been dropped due to a particular radio failure creating isolated subnetworks. Reporting processes built into the Building Controller monitor the nodes in the network, gather interconnectivity data, and take into account the window controller addresses to assist the installer in insuring that all nodes are capable of communicating with the Hierarchical Control Points. Where it might be found that some portion of the overall network is isolated from another portion, special nodes may be installed in a geographical area between existing segments of the network, in order to provide a bridging point for data to move from one network segment toward the other. There should typically be at least two nodes to bridge isolated segments together. The bridges are nothing more than window Scalable Controllers that are not connected to any SPD window.

The Scalable Controllers may be equipped with various types of sensors that may be used in more finely controlling the energy usage in a building. A photocell may be placed onto each SPD glass and connected to its SC. The Building Control Point "BCP" may command all the SCs to periodically send sensor data to the BCP or the BCP may periodically poll each of the SCs to read photocell and other sensor data. Through an initial system configuration procedure at the BCP, it is made aware of the configuration of the building, the compass direction in which windows face, the latitude and longitude of the building, the angle at which each window is from the vertical, and the location of unique node and window addresses. Input from photocells throughout the building allow the BCP to utilize voting techniques to determine the best areas of the building in which to increase or decrease opaqueness in order to reduce the overall building energy requirements for heating and air conditioning. If a readable compass and glass angle detector is installed at each SC, the process of modeling the building to establish more precise control of each window, is simplified, by directly providing this configuration information.

The BCP allows the system operator to establish special overrides for portions of the building at certain times of the day and days of the year. This might be utilized to specify a region of the building undergoing glare from reflections from other buildings or natural features in the area. The override features would allow a normally clear window to perhaps to be darkened for some period to eliminate the glare onto that portion of the building. So some regions of a building might be under automatic control while other segments of the building may be under special override conditions at the time. A complex combination of each control may be in effect at one time.

Many "Green" buildings already incorporate an Intelligent Energy Control System such as the Honeywell Enterprise Buildings Integrator (EBI). These types of systems operate/monitor/control the building HVAC system, circulation of fresh air, elimination of building odors, control of electric usage, and reduction of energy requirements to unoccupied areas. These top-of-the-line systems also incorporate building security, monitoring and access control, asset tracking, fire and smoke detection and even control fire doors and public announcement systems. This invention extends the capabilities of these sophisticated systems in a manner that was never possible before. These system may now effectively control the skin of the building dynamically during the day, optimizing the use of the sun along with the movement of heat and air conditioning around the building. The combination of both systems provides a level of efficiency of an even higher level than that capable of standalone windows or BCP controlled windows, since it directly controls multiple subsystems in a building in a coordinated fashion.

In this instantiation of the invention, the BCP will provide an interface to an external system to provide additional sensor data to the external system and to allow the external system to request adjustments to light levels around the building in a high-level form. One of the preferred high-level forms in which an external system will represent sensor data and requests to adjust light levels to the BCP and the BCP will represent responses to such data and requests through this interface is known as XML. XML is an abbreviation for Extensible Markup Language and is a widely used open standard for organizing and exchanging structured documents and data between two computers. A computer to computer link over which data is transferred in the XML format. is often referred to as an XML link or an XML interface. The BCP takes requests from the XML link, interprets them and executes them by sending the proper commands through the hierarchical network to effect the changes requested by the external Intelligent Energy Control System (IECS). When operating in this mode, the automated controls of the BCP are bypassed. A periodic "heartbeat" transfer of XML command/responses over the BCP/IECS link insures that the two systems remain in sync and that they coordinate operations. In the event the heartbeat is lost, the BCP can fall back to its automated mode and operate the building independently until the IECS system comes back on-line.

This invention utilizes low-cost, low-power, limited-range Radio Transceivers co-located with each window controller device, to form a large scale wireless network between all of the windows in a residential or commercial building. Windows are typically within 10 meters of each other within buildings, so limited range transceivers are perfectly suited for this environment. The microprocessor-driven software within each controller operates the local application functions of the controller while at the same time executing radio packet switching type software used to send messages from source nodes to destination nodes in a building, even though the source and destination node are not in direct communication with each other because of their distance from each other. The data which are to be moved from the source to the destination are sent to a transceiver which is reachable from the source node, and toward another radio transceiver that is reachable along a path which will eventually get the packetized data to the desired destination.

Figure 6:
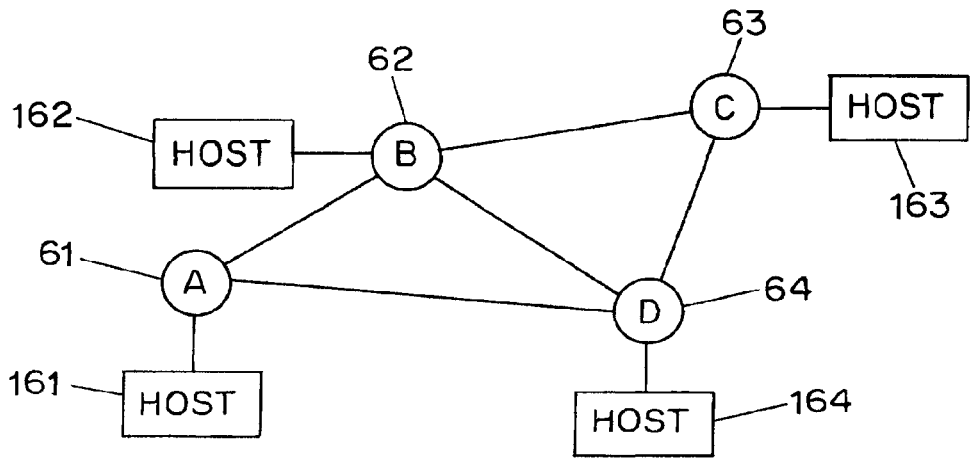
FIG. 6 shows one of the earliest packet switching or mesh networks in which data may be sent along alternate paths through intermediate nodes in order to reach a destination point. This is an example of the 4-node Arpanet in 1969, the precursor to today's Internet. Host computers sent data to other Host computers in this network and utilized the services of the Interface Message Processor (IMP) to move data packets to other IMPs which were not destination point but would further relay packets toward the IMP directly connected to the desired destination Host.

The technique of moving messages from source computers to destination computers through intermediate points in a multiply-connected array of computers was originally referred to as Packet Switching and was first characterized in the Arpanet, the precursor to the Internet in 1969. FIG. 6, which represents the Arpanet's 4-node network operational in December 1969, could potentially send a packet of data from Host 161 to Host 163, by handing the data packet to Interface Message Processor (IMP) 61, which might forward it to IMP 62, and to IMP 63 where it is handed to destination Host 163. If IMP 62 finds that the link to IMP 63 is not functioning for some period of time, the same data from Host 161 to 163 could be handed over to IMP 64 to forward the data to IMP 63 instead of using the failed direct link. The concept in a packet-switched network is to locate alternate paths to get the packet to the ultimate destination point even if some individual communication paths are out of service. Some packet networks utilize fixed routing tables to define alternate data paths in the event of link failures and have algorithms to determine when primary or alternate paths are to be utilized. Other packet networks have dynamically updated routing information that is periodically updated between adjacent nodes in order to continually maintain a list of the best route to any ultimate destination in the network.

With improvements in hardware and software, the separation of a Host (applications processor) and a packet switching network of nodes (the Interface Message Processors—IMP's) was no longer necessary. The 1980 ITT-DTS Faxpak facsimile Store-and-Forward packet switching system integrated an application which provided compatibility between different speed fax machines of the time, with a message passing network which allowed messages to always be delivered locally instead of via what (in those days) were more expensive calls over long-distance lines. The Wide Area Paging network in FIG. 7 ran an application that permitted any node in the network to accept a paging message (phone number) specified through a dial-in telephone call, a text message received from an operator, or a message received from a remote node, to a paging message that would be encoded and transmitted at a destination node. The packet switching software that operated at the same nodes, directed paging application packets to be dropped off at the proper destination node or nodes to page a person in multiple cities.

Packet networks typically operated with dedicated communication circuits between nodes in different cities. More recently, the same multi-path packet switching technique has been deployed into networks of radio transceivers, utilizing radio links in lieu of wired links between pairs of nodes. These radio packet switching systems have become known as mesh networks. Unlike the 2-D wired communication circuits as in FIG. 7, the radio devices in a mesh network permit point-to-point communications within a 3-D region of each node. In an office environment, where each window may represent a node, windows within a few feet left or right of a particular window can be thought of as potential intermediate nodes, as well as windows that are potentially a few floors above or a few floors below a particular window.

In this instantiation, a header packet in each transmission packet specifies the source node address, destination node address and the address of the next hopping point along the path to the destination. This data is transmitted in three dimensions when it is time for this Scalable Controller to transmit information to another point in the network. Many receivers will detect interference in the data they receive, and will ignore the received data. Several other receivers may receive the packet but with transmission errors. Only the node to which the correctly received packet is addressed will keep the packet, analyze it and will decide if the data item is to be forward toward another intermediate node to the final destination or if the packet is to be handled by the application software at this node.

To allow multiple commands to be outstanding and be executed at different points in the network simultaneously, a logical hierarchical structure is introduced into the network. Certain network nodes are designated as Hierarchical Control Points (HCP) that only forward data toward lower level Hierarchical Control Points. Ultimately, the lowest level HCP logically forwards data only to a subset of all Scalable Controllers in the network. This logical configuration allows a single command to be branched out in multiple commands and each of those commands to further expand to even more multiple commands, thereby controlling the maximum number of nodes with the minimal number of control messages at the highest level. So a command to make all windows clear in a segment of a building would be initiated at the highest level node and be handed down to lower levels nodes that understood where this command needs to be sent in order to effect the desired windows in the building.

On the other hand, sensor data that was considered as an urgent data item to which to reach, captured at the individual Scalable Controllers, would be directed to higher and then higher levels of HCPs until the data item reaches the highest level HCP.

Turning to FIG. 1, we see an SPD window controller 2 under manual adjustment from a single external device 1. It controls a window 5.

Figure 2:
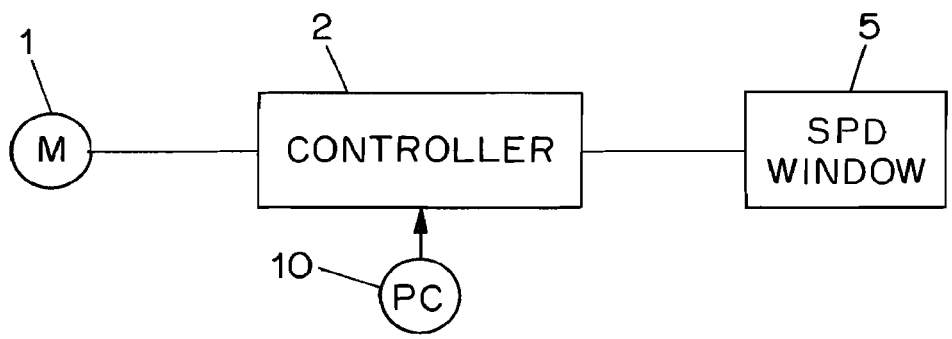
FIG. 2 is the controller of FIG. 1 with the addition of a photocell or other photosensor to detect the brightness of sunlight shining on the window under control.

FIG. 2 shows the controller of FIG. 1 with the addition of a photocell 10 to detect the brightness of sunlight shining on the window 5 under control.

Figure 3:
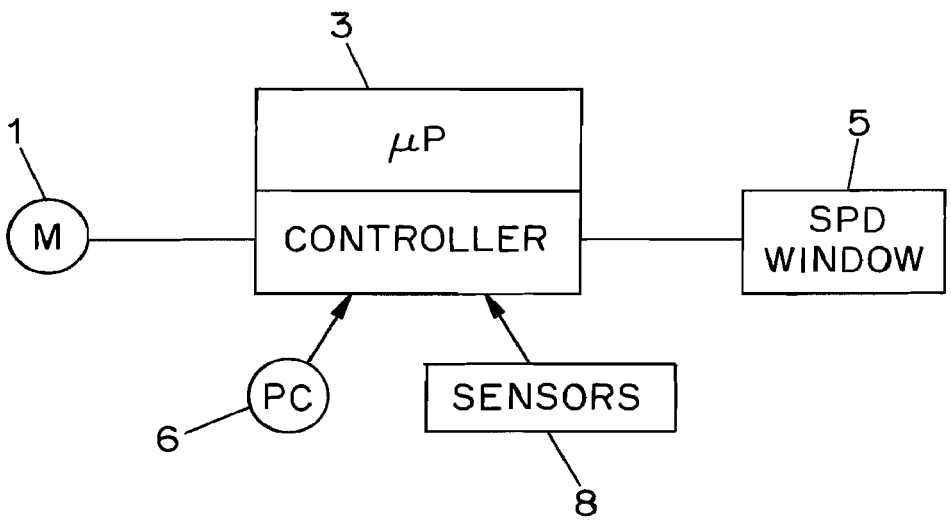
FIG. 3 creates the Intelligent Controller from FIG. 2 by introducing a microprocessor to perform a number of different functions in support of more sophisticated controller capabilities as well as Scalable Network operations of controllers. In addition to the photocell or other photosensor additional inputs from sensors expand the data which the Scalable controller may use to make decisions on how to change window opacity.

FIG. 3 creates the Intelligent Controller from FIG. 2 by introducing a microprocessor 3 to perform a number of different functions in support of more sophisticated controller capabilities as well as Scalable Network operations of controllers. In addition to supporting the photocell 6 or other photosensor as the non-Intelligent controller of FIG. 2, additional inputs from sensors 8 expand the data which the Scalable controller may use to make decisions on how to change window opacity.

Figure 4:
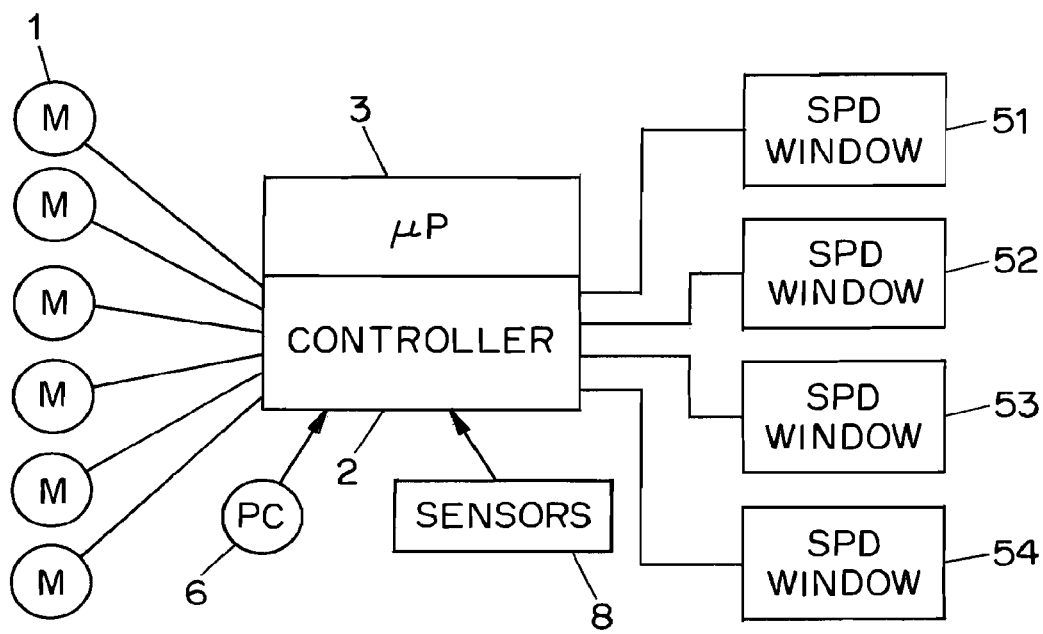
FIG. 4 shows the Intelligent Controller with a plurality of manual inputs that are coupled to one or several window panes that are under the direct control of the controller as set up by the user via a set up procedure in the control software. A single manual input may control one window or, two, three or four at one time as if it were a single piece of SPD glass. More then one manual input may be used to control the same set of glass in order to support manual controls that operate from different points in the same room.

FIG. 4 shows the Intelligent Controller with a plurality of manual inputs 1 that are coupled to one or several window panes 51-54 that are under the direct control of the controller as set up by the user via a set up procedure in the control software. A single manual input may control one window or two, three or four at one time as if it were a single piece of SPD glass. More than one manual input may be used to control the same set of glass in order to support manual controls that operate from different points in the same room.

Figure 5:
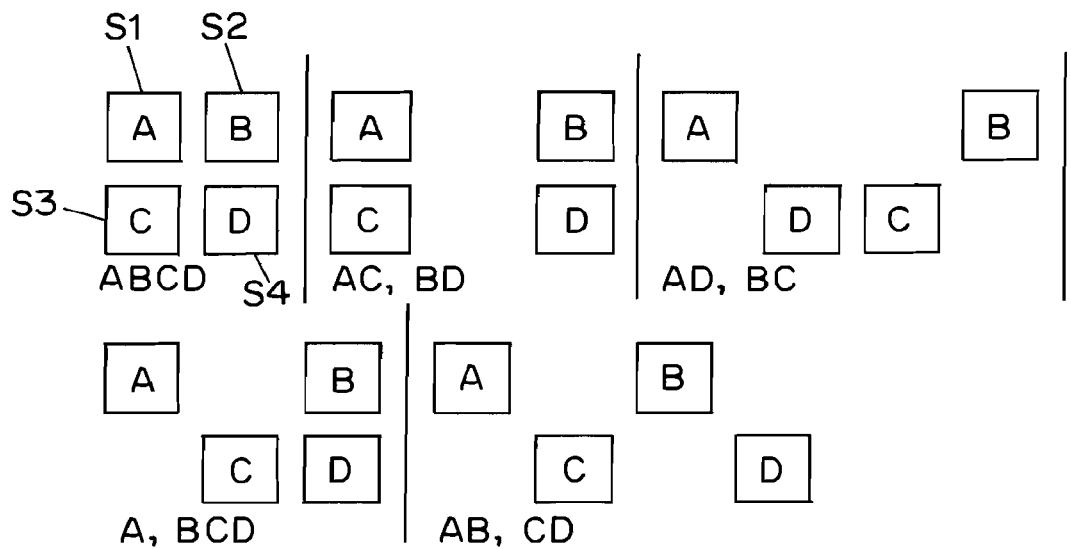
FIG. 5 shows different combinations of four-window panes in this example, and how the set up software allows any combination of sets of individual panes to be treated as a single pane of glass.

FIG. 5 shows different combinations of four-window panes in this example, and how the set up software allows any combination of sets of individual panes to be treated as a single pane of glass. In a setting of four windows under the Scalable Controller, where the windows are referred to as A, B, C and D, a user may configure the SC so that windows AC are controlled as a single window and BD as another, or BCD is controlled as a single window and A as another, or ABCD is controlled as a single window or, A, B, C, D, are controlled as four separate windows.

FIG. 6 shows one of the earliest packet switching or mesh networks in which data may be sent along alternate paths through intermediate nodes in order to reach a destination point. This is an example of the 4-node Arpanet in 1969, the precursor to today's Internet. Host computers sent data to other Host computers in this network and utilized the services of the Interface Message Processor (IMP) 61 to move data packets to other IMPs 62, 64 which were not destination points but would further relay packets toward the particular IMP 63 directly connected to the desired destination Host 163.

Figure 7:
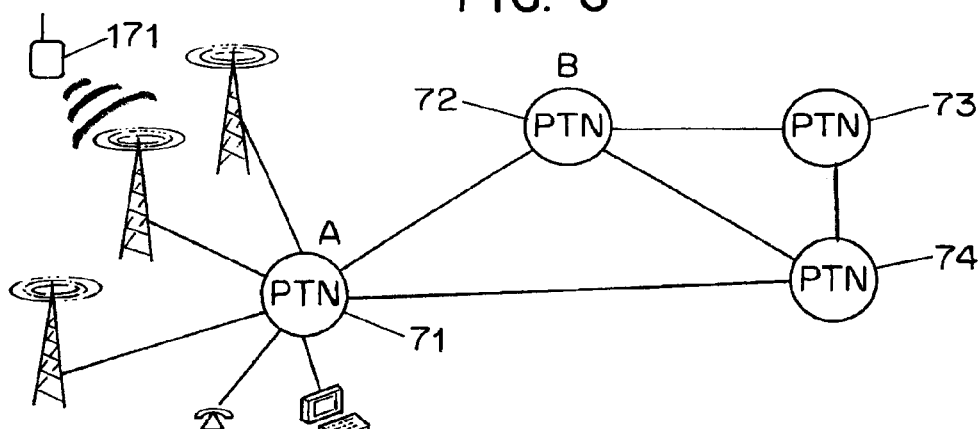
FIG. 7 shows a more advanced packet switched meshed network in which specific processing applications operate on the same computer that is running the packet switching software thereby combining the functions of Hosts and IMPs in the earlier Arpanet systems. Increases in microprocessor power allowed these functions to be combined onto a single platform. This is an example of a Radio Paging Network application utilizing the Data Link Handler (DLH) protocol created by the Inventor to convert isolated Citywide radio paging (beeper) systems, also known as Paging Terminal Nodes (PTNs), into a nationwide network capable of alerting someone wherever they are located in the country instead of just a single city. The Arpanet and Internet utilize formalized routing protocol specifications such as the Routing Information Protocol (RIP) to dynamically maintain a list of best routes to a destination at each node. DLH utilizes a proprietary routing protocol to maintain a list of primary and alternate routes. The proprietary DLH network was eventually replaced with the Radio Paging Industry standard Telocator Network Paging Protocol (TNPP) protocol which the Inventor helped to create and Chaired the Industry committee to promote the use of this protocol for more than 11 years. TNPP was used along with a manufacturer-specific proprietary routing protocol to maintain the best and alternate paths to each destination node.

FIG. 7 shows a more advanced packet switched meshed network in which specific processing applications operate on the same computer that is running the packet switching software thereby combining the functions of Hosts and IMPs in the earlier Arpanet systems. Increases in microprocessor power allowed these functions to be combined onto a single platform. This is an example of a Radio Paging Network application utilizing the Data Link Handler (DLH) protocol created by the Inventor to convert isolated Citywide radio paging (beeper) systems, also known as Paging Terminal Nodes (PTNs), into a nationwide network capable of alerting someone wherever they are located in the country instead of just a single city. The Arpanet and Internet utilize formalized routing protocol specifications such as RIP to dynamically maintain a list of best routes to a destination at each node. DLH utilizes a proprietary routing protocol to maintain a list of primary and alternate routes. The proprietary DLH network was eventually replaced with the Radio Paging Industry standard TNPP protocol which the Inventor helped to create and Chaired the Industry committee to promote the use of this protocol for more than 11 years. TNPP was used along with a manufacturer-specific proprietary routing protocol to maintain the best and alternate paths to each destination node. A paging message originating at Paging Terminal Node (PTN) B 72 might be passed to other PTNs 73, 74 until reaching a PTN 71 which is in turn coupled with antennas which pass digital information in RF form to a pocket paging receiver 171.

Figure 8:
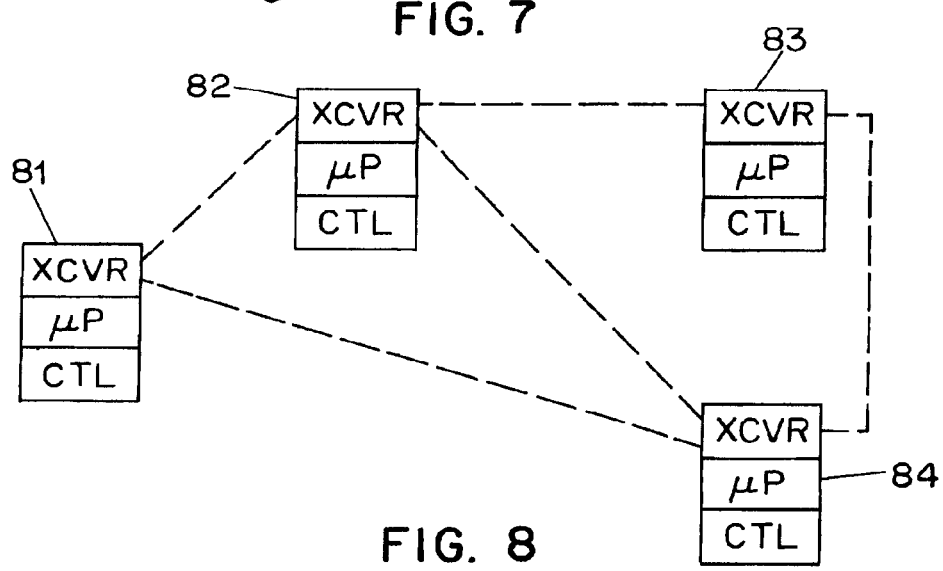
FIG. 8 shows a Scalable Controller network consisting of the Intelligence Controller of FIG. 3 integrated with a radio transceiver (XCVR) to send packets of data to other transceiver equipped Scalable Controller (CTL) nodes. Routing data similar to the Internet RIP, maintains a list at each Controller node of the best next node to receive data on the path to the destination node. Unlike the wired network of FIGS. 6 and 7, the radio network of FIG. 8 may sometimes properly receive data addressed to a different node than that which received it. In this case, the received data is ignored/dropped by the node which is not the next node along the optimal path to the destination.

FIG. 8 shows a Scalable Controller network consisting of the Intelligent Controller of FIG. 3 integrated with a radio transceiver (XCVR) to send packets of data to other transceiver equipped Scalable Controller (CTL) nodes. Routing data similar to the Internet RIP, maintains a list at each Controller node of the best next node to receive data on the path to the destination node. Unlike the wired network of FIGS. 6 and 7, the radio network of FIG. 8 may sometimes properly receive data addressed to a different node than that which received it. In this case, the received data is ignored/dropped by the node which is not the next node along the optimal path to the destination. Each controller 81, 82, 83, 84 has a controller, a microprocessor, and a radio transceiver.

Figure 9:
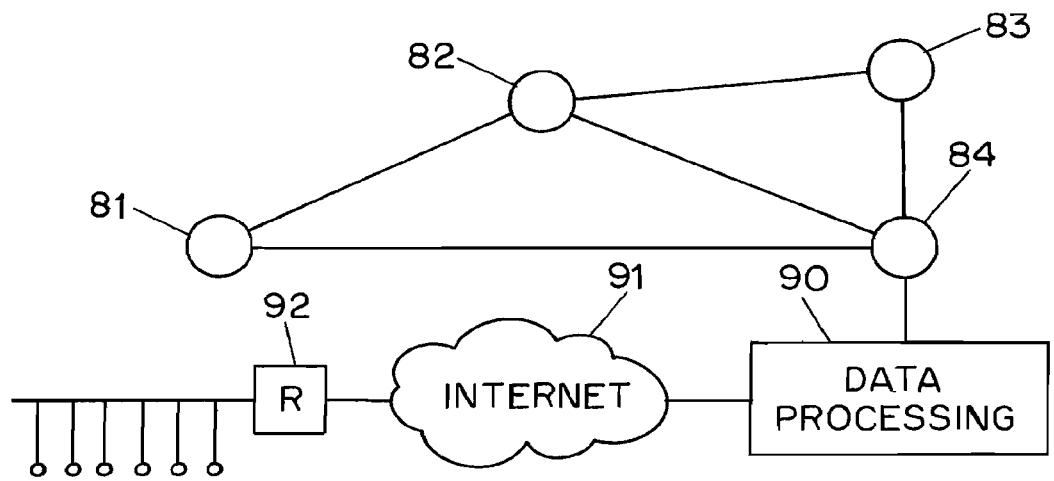
FIG. 9 shows an example of a network of FIG. 8 where a Building Control Point is connected to one of the nodes of the network. The BCP is a data processing site to determine which portions of a building are to be automatically set to a specific opacity at any moment of the day or night. The Data Processing system may optionally be connected to the Internet and to a remote central monitoring service which oversees the operations of the SPD Building Skin Control System on behalf of many building owners.

FIG. 9 shows an example of a network of FIG. 8 where a Master Building Control Point (MBCP) 90 is connected to one of the nodes of the network. The MBCP 90 is a data processing site to determine which portions of a building are to be automatically set to a specific opacity at any moment of the day or night. The Data Processing system may optionally be connected to the Internet 91 and to a remote central monitoring service 92 which oversees the operations of the SPD Building Skin Control System on behalf of many building owners.

Figure 10:
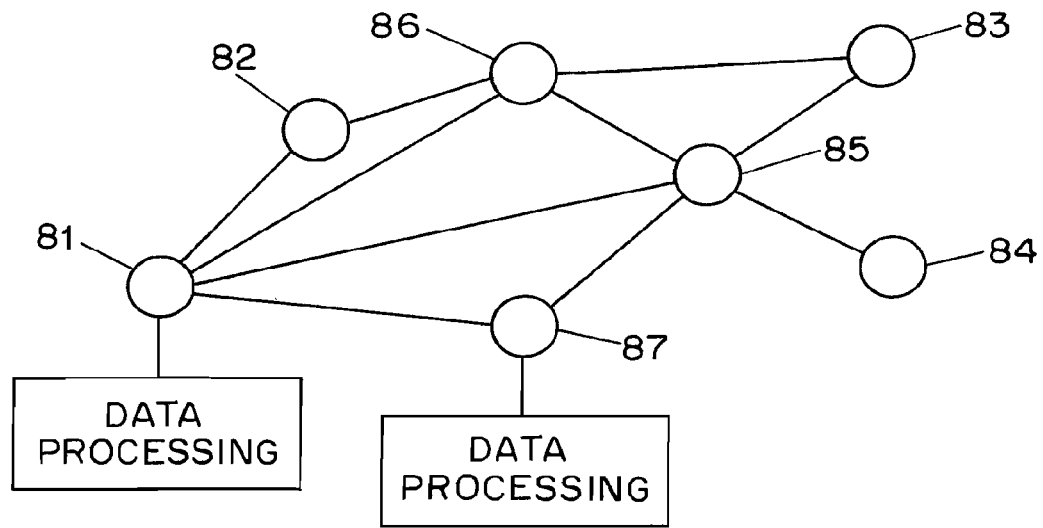
FIG. 10 shows an example of a redundant Master Building Control Point (MBCP) consisting of a primary MBCP and a secondary MBCP in the network to insure that the entire system continues to operate normally even if the primary MBCP should fail. If the primary MBCP should fail, the secondary MBCP will take over its functionality so that the entire system continues to operate normally.

FIG. 10 shows an example of a redundant Master Building Control Point (MBCP) consisting of a primary MBCP and a secondary MBCP in the network to insure that the entire system continues to operate normally even if the primary MBCP should fail. One MBCP (shown as a data processor) is connected to node 81 and a second MBCP (also shown as a data processor) is connected to a node 87. If the primary MBCP should fail, the secondary MBCP will take over its functionality so that the entire system continues normal operations.

Figure 11:
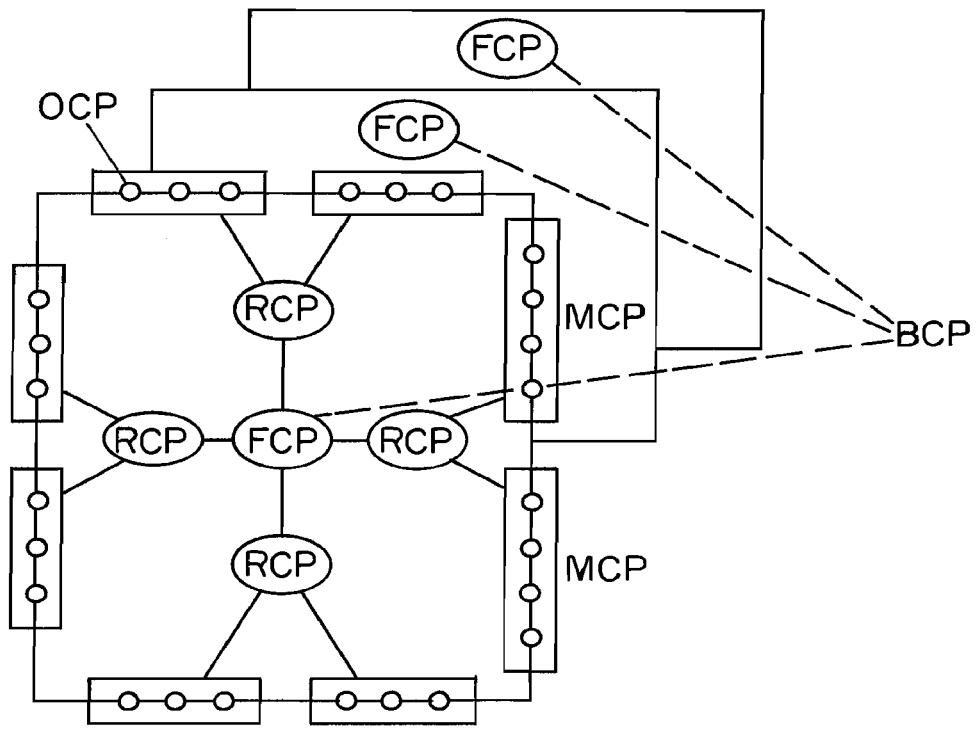
FIG. 11 shows how different areas of a building would have different types of Hierarchical Control Points to oversee the operation of Scalable Controllers in certain portions of a building.

FIG. 11 shows how different areas of a building would have different types of Hierarchical Control Points (HCPs) to oversee the operation of Scalable Controllers in certain portions of a building.

Figure 12:
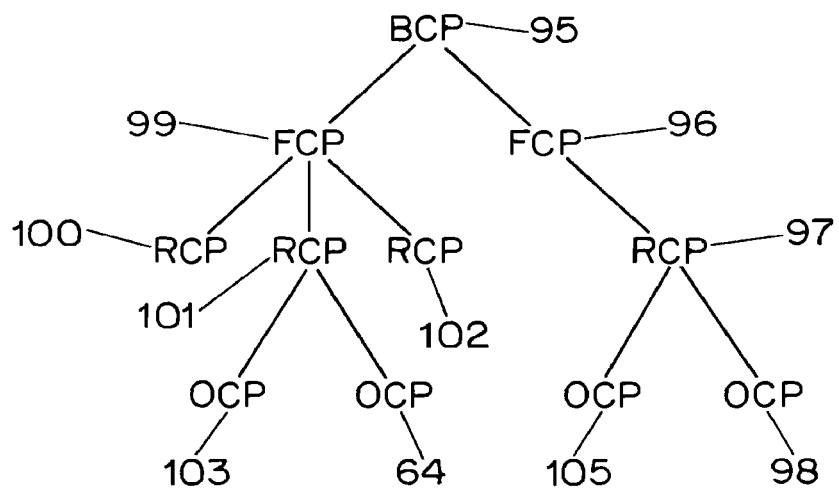
FIG. 12 is a Hierarchical mapping of Control Points showing how commands generated at the highest level Control Point are logically distributed to lower level Control Points that distribute the commands to more and more elements at lower hierarchy levels.

FIG. 12 is a Hierarchical mapping of Control Points showing how commands generated at the highest level Control Point are logically distributed to lower level Control Points that distribute the commands to more and more elements at lower hierarchy levels. There may be several Office Control Points (OCP), Section Control Points (SCP), Region Control Points (RCP), Floor Control Points (FCP), Multi-floor Control Points (MCP) and a single Building Control Point (BCP) located in typical building environment. A single Control Point might exist in a small implementation while all types of Control Points may exist in a very large-scale implementation. The use of additional Control Points reduces communication overhead in the mesh network and decreases the time delay between the time a window opaqueness modification command is sent and when it is acted upon at individual windows. In this instantiation of the invention, any window SC can become a Control Point via a command sent from the Master Building Control Point. Although a Master Building Control Point is an Intelligent Data Processing System, the lower hierarchical control points have a relatively small set of fixed commands and operations which can easily be handled at the Microprocessor at any window SC. In an intermediate size implementation of the Scalable Controller Network, the MBCP can inform the FCPs 96, 99; the FCPs will distribute the request to the RCPs 97, 100, 101, 102; the RCPs will send the command to OCPs which will command each window controller in an office (not shown for clarity) to execute the required change. Because of the expansion to multiple nodes at each level of the hierarchy, commands may be simultaneously sent within different non-overlapping areas of the network where they may pass through intermediate nodes with no or little queuing delay, thus having the request executed throughout the building in a seemingly simultaneous fashion.

Figure 22:
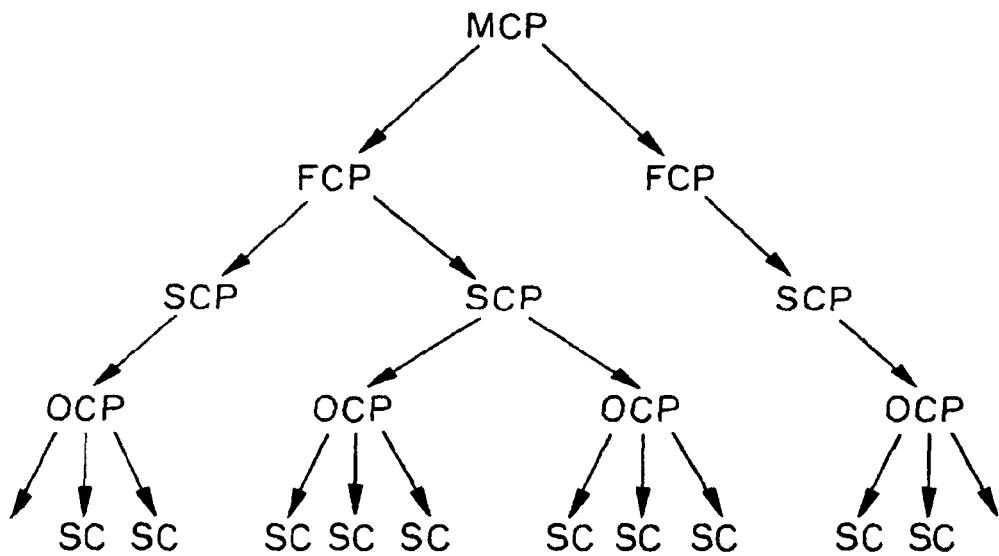
FIG. 22 shows the logical connections that form a hierarchy of control points in order to reduce the point to point communication loading on the MCP to issue commands to all SCs in a building.

FIG. 22 shows the logical connections that form a hierarchy of control points in order to reduce the point-to-point communication loading on the Multi-Floor Control Point MCP to issue commands to all SCs in a building. In the example shown, the MCP sends commands to two Floor Control Points (FCP) that are optimally placed on separate LANs. Simultaneously, each FCP can relay the command to Section Control Points (SCP) that in turn may transmit the commands to Office Control Points (OCP). Each OCP may simultaneously relay the commands it has received to the one or more SCs for which it is responsible. Ultimately all of the SCs will have received the required commands, but the hierarchical structure reduces the total number of data transmissions across the entire network to reach each SC from the MCP.

Figure 13:
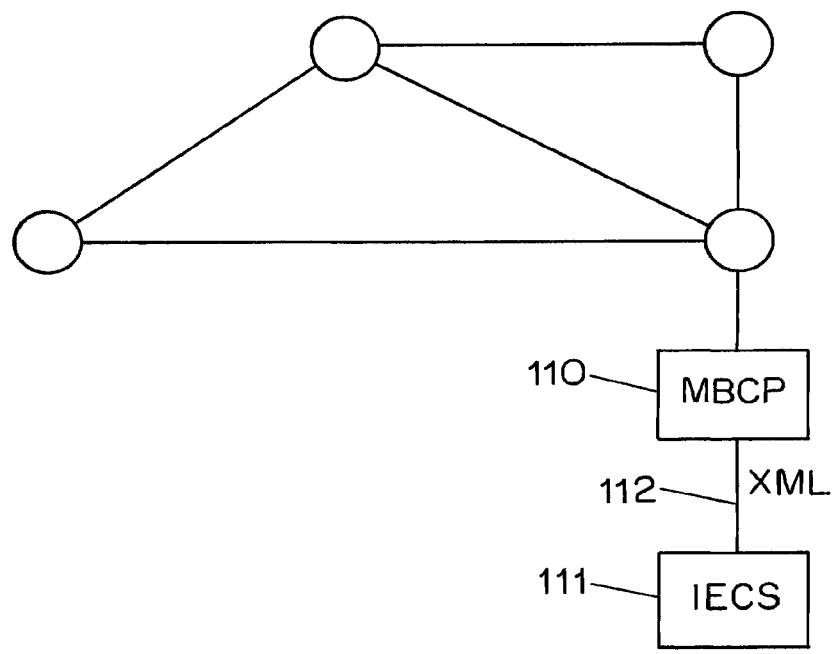
FIG. 13 shows how the Master Building Control Point interfaces with an Intelligent Energy Control System (IECS) via a computer interface utilizing the widely used Extensible Markup Language format referred to as XML.
Figure 23:
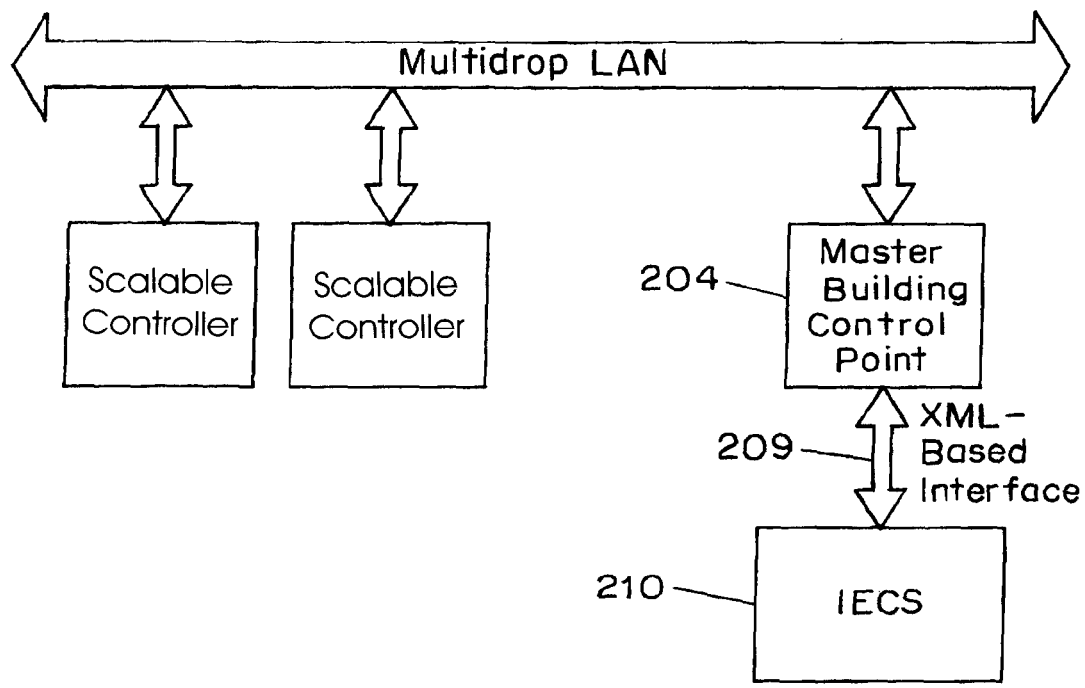
FIG. 23 shows how the Master Control Point, which provides the central control intelligence for all of the individual windows in a structure, can connect to an external Intelligent Energy Control System via a computer interface using the widely used Extensible Markup Language format referred to as XML. The external system can modify its operations knowing where windows have been changed. The external system may receive sensor input through the MCP and may command the MCP to modify the setting or some or all windows under its control. The MCP also has the option of changing the operation of the windows under IECS command if better algorithms have been developed on the IECS and the External system starts sending the proper control commands.

FIG. 13 shows how the Master Building Control Point 110 interfaces with an Intelligent Energy Control System (IECS) 111 via an XML interface 112. FIG. 23 shows in more detail how the Master Building Control Point 204, which provides the central control intelligence for all of the individual windows in a structure, can connect to an external Intelligent Energy Control System 210 via an XML link 209, so that the external system may receive sensor input through the MBCP and may command the MBCP to modify the setting or some or all windows under its control.

Figure 14:
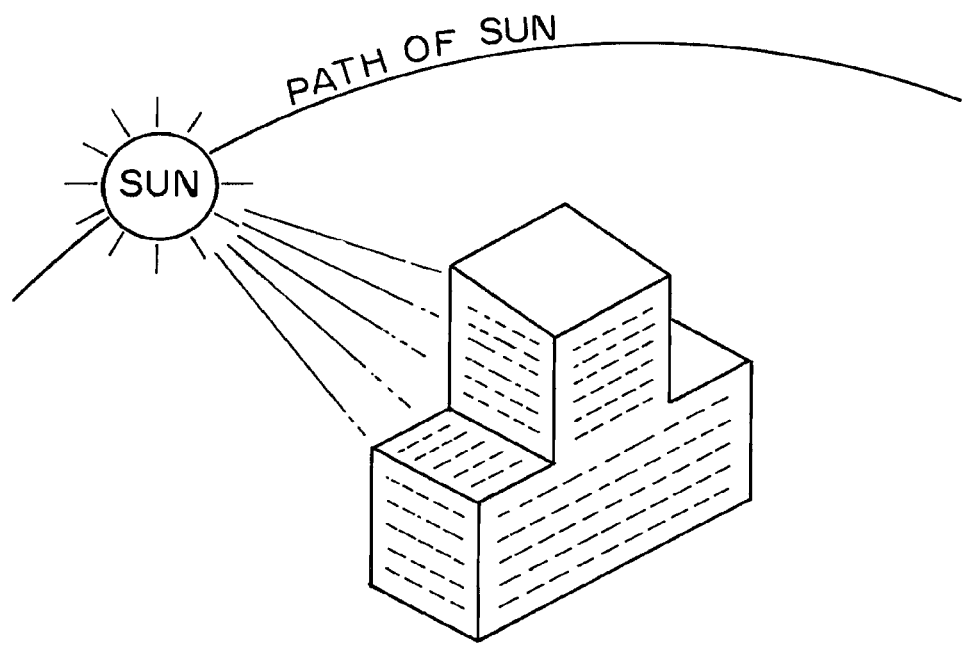
FIG. 14 shows how the path of the Sun across the sky changes how the sunlight falls on the windows of a building throughout the day. The Sun path changes slightly each day of the year as the Earth rotates around the Sun. For any latitude and longitude on the planet, the path that is traversed is well known.

FIG. 14 shows how the path of the Sun across the sky changes how the sunlight falls on the windows of a building throughout the day. The Sun path changes slightly each day of the year as the Earth rotates around the Sun. For any latitude and longitude on the planet, the path that is traversed is well known.

Another embodiment of the invention transforms an array of windows into a part of a multi-media display. Office buildings are often decorated in a manner as to enhance the appearance of the city in which it is located. In Houston, for example, many of the large buildings are outlined in rows of small lights on the perimeter of each building so as to form an outline of the cities skyline each evening. During holidays, many buildings will turn specific lights on and off in the building late at night when the building is primarily empty so as to display some pattern associated with the holiday. For example, during Christmas, a cross may appear in the windows of a large building. Or diamond shape patterns may be displayed at different floor levels of a building and at adjacent buildings as part of the winter season.

This embodiment extends the MBCP functions so that it may direct SPD windows to be part of a video presentation. The controllers are unaffected when adding this capability because they already have the ability to change any pane of glass under their control to any setting from clear to dark or any setting in between under manual or under automated control from the MBCP. So a special, non-energy-efficiency-related application may exist in the MBCP to operate the windows in a special manner as desired by the building operator.

Textual Messaging Mode

There are two modes of operation, although they may both operate simultaneously. The first mode is to use SPD windows to form a textual display of messages. In its simplest application each pane of SPD glass represents a single pixel of information. The size of the window pane and the matrix size making up a letter defines how far away the user must be from the window to be able to clearly read the letters formed. In some cases a square box of 4 or 9 (2.times.2 or 3.times.3) windows may be controlled as one in order to increase the size of an individual pixel. Each controller receives a command from the MBCP to set its pixel to on or off or at some degree of shading. Using a set of 48 windows, a 6.times.8 pixel array may form any letter or punctuation and include a one-pixel border around each letter.

The MBCP may operate in another mode where the message(s) to be displayed is given to it via an external system rather than from local consoles on the MBCP. The MBCP will support several interfaces for message entry. This includes an XML type command set between the MBCP and an external system. The command set may operate over a LAN connection, serial port, infrared port or other physical method. The MBCP may be programmed with a sequence of letters/words/messages to display, with timing information, and with a starting pixel location. Changing the window/pixel settings at the specified rate will provide the sensation that the text message is scrolling across the windows. This is done, for example, by removing one vertical column of pixel data on the left side of the display by shifting the setting of one window to the right over to the one window on the left. The column of pixels at the right-most window is for the next letter to be displayed. This provides a smooth scrolling right to left. In a similar manner the letters may also be scrolled left to right for languages written in the opposite direction. The starting location of each row of text may be specified so that messages may start at any floor of windows or several floors at the same time.

Logic in the MBCP will also provide for other textual display features taking advantage of the capabilities of SPD Glass. For example, letters may appear upside down and be changed right side up. They could perhaps be rotated vertically along any of the rows that make up each letter. The pixels can start at clear and the letters can be formed by varying the darkness of each pixel individually or from top to bottom or bottom to top for some interesting special effects. Words can be brought into display in the same manner. Darkening columns of pixels left to right and right to left meeting in the middle of a sentence or starting in the center and radiating out to the left and right. Or different starting columns may be selected and the pixels may radiate out in one direction or both as the letters darken. There is no limit as to the combinations that can be made to make the generation of the display more interesting than just displaying a letter at a time at a given intensity. Of course any of these special display methods will be available over the XML interface so external devices may drive arrays of SPD Glass.

Although this example reviews the use of SPD Glass on an office building as a means of displaying messages, this may be scaled down to smaller applications, depending upon the size of each pane of glass or pixel. For example, messages could be scrolled across an atrium of SPD glass just above the heads of people standing under it. Or, if very small panes of glass are used, small moving displays of SPD glass could be created.

Video Mode

The SPD windows on a structure may also be looked at as a sea of pixels each capable of being set to any shading level from 0% to 100%, the ends of the range being thought of as Off and On. There is an endless combination of different light level settings across each pixel in a large array, to provide many random and well-structured visual effects that would entertain people viewing such a display. A large number of preprogrammed sets of sequences may be defined and stored in the MBCP. Each sequence may provide some special effect seen across the glass. Sequences may be defined such as:

Flash from all dark to all light
Start from all dark and lighten to clear slowly
from left to right
right to left
top to bottom
bottom to top
center to edge in a increasing squares manner
edge to center
Checkerboard pattern
And many many others The MBCP will support many means of initiating a sequence and the ability to store away 'scripts' of preprogrammed sets of sequences. The MBCP will be able to be driven via the serial port or LAN connection of a PC. It can also support an external device that is actually an array of buttons and switches, where the combination of a switch setting and pressing a button initiates a pre-programmed sequence. In this way an operator may "play" sequences in time to external music, just as a laser light show operator uses a similar type panel to initiate pre-programmed lighting effects that are in tune with the music playing. An elaborate array of new sequences may be established off-line and sent to the MBCP from an external system at any time. Some of these external sequences may be later stored in the MBCP and called up by reference number rather than having to repeatedly download the sequence from an external device. For further integration in a multi-media environment, when the window array is set to full dark, video projectors could potentially be utilized to display moving images across the SPD glass. This sequence would be requested when external video projectors are commanded to start displaying video data.

The array of pixels associated with one instantaneous state of a sequence, is set to specific levels via the sending of wireless commands to each of the necessary controllers to set its associated pixels to the proper setting. The wireless command may be received directly from the radio interface at the MBCP or via any intermediate node(s)/controller(s) in the array (mesh packet network) when the controller of a particular pixel is not in direct communication with the MBCP.

The ability of the MBCP to provide visual special effects across window arrays is further enhanced through a set of special interfaces that are supported by the MBCP. The MBCP can be made to appear as a controllable lighting system to lighting industry standard DMX based Intelligent Control System. These systems already have support for creating and saving scripts of special effects in support of multi-media lighting shows.

X.10 Control of SPD Windows

Figure 18:
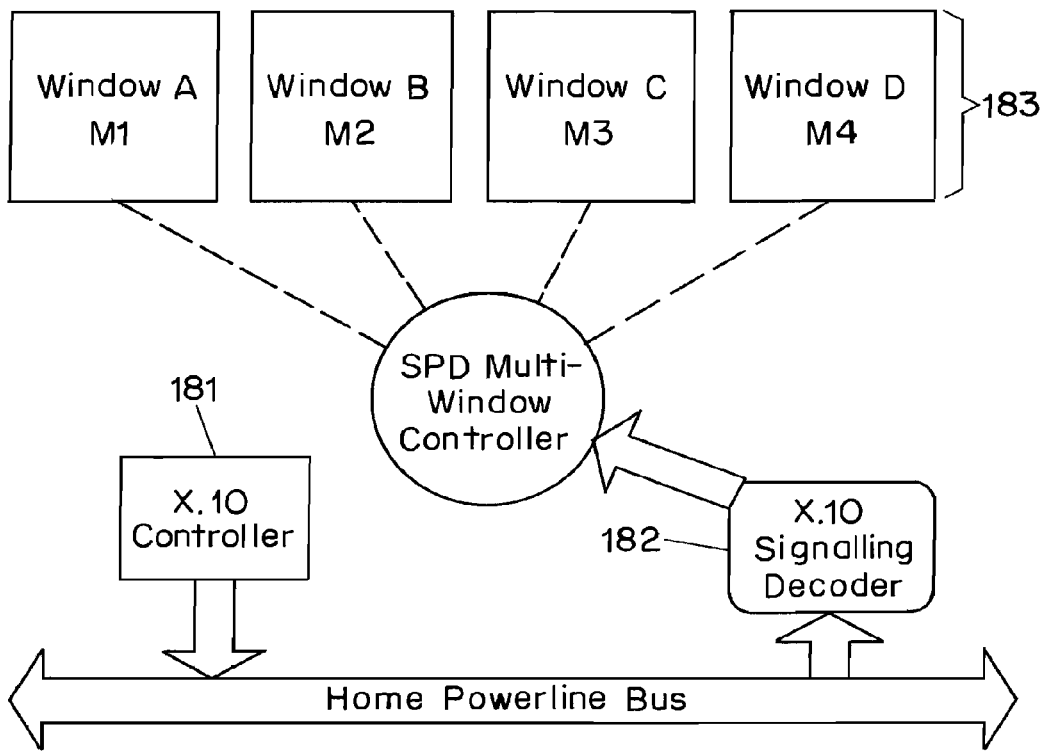
FIG. 18 shows a controller sending a command to a decoder which in turn communicates commands to windows.

The controllers of the invention may operate over a wireless network in support of automatic remote control in a large building environment. But in smaller environments, such as a residential project having perhaps 16 windows, the wireless control solution may be overly expensive in some situations. In order to address this situation, there is another variation of the scalable controller. Instead of integrating the controller with a radio transmitter and receiver as described above, this invention provides an interface to the above controller which is capable of receiving X.10 control signals over a 110 VAC/220 VAC power line. A United States patent that is now expired covered the X.10 communication protocol. Yet, because of how long it has been in existence, the number of compatible products that exist, the easy availability of X.10 controllers that send control signals over the power line, and their low cost, an X.10 compatible interface is desirable. FIG. 18 shows a controller 181 transmitting X.10 signals, sending a command to an X.10 decoder 182 which in turn communicates commands to windows 183

The X.10 interface option will be placed onto the controller circuit card that is operating one or more panes of glass. Each controller will operate via a direct power connection to the 110 VAC/220 VAC power line. Up to 256 windows may be controlled in this environment. Each window controller will be assigned an X.10 Letter (Home/Network ID) and Number Code (Device ID). When the window controller sees its address on the powerline bus, it will then look for a command signal such as ON, OFF, DIM UP, DIM DOWN. An ON signal will be executed at the controller as a signal to set the window to full Dark. An OFF signal will be interpreted as setting the window to full Clear. The controller maintains the current setting of the window under its control. A DIM UP command will slowly increase the darkness of a window from 0% toward 100% and a DIM DOWN command will slowly decrease the darkness making the window clearer. Any X.10 device capable of sending these four signals to any of the 256 possible X.10 addresses will now be capable of controlling any SPD window. X.10 controllers currently exist to send these four signals under manual control or to program a computer to send commands at particular times of the day. This will provide a very simple means of local control of a small number of SPDs. A similar interface will exist for support of several wireless replacements to X.10 devices, Z-Wave, Insteon, and 802.11.15 ZigBee.

Figure 15:
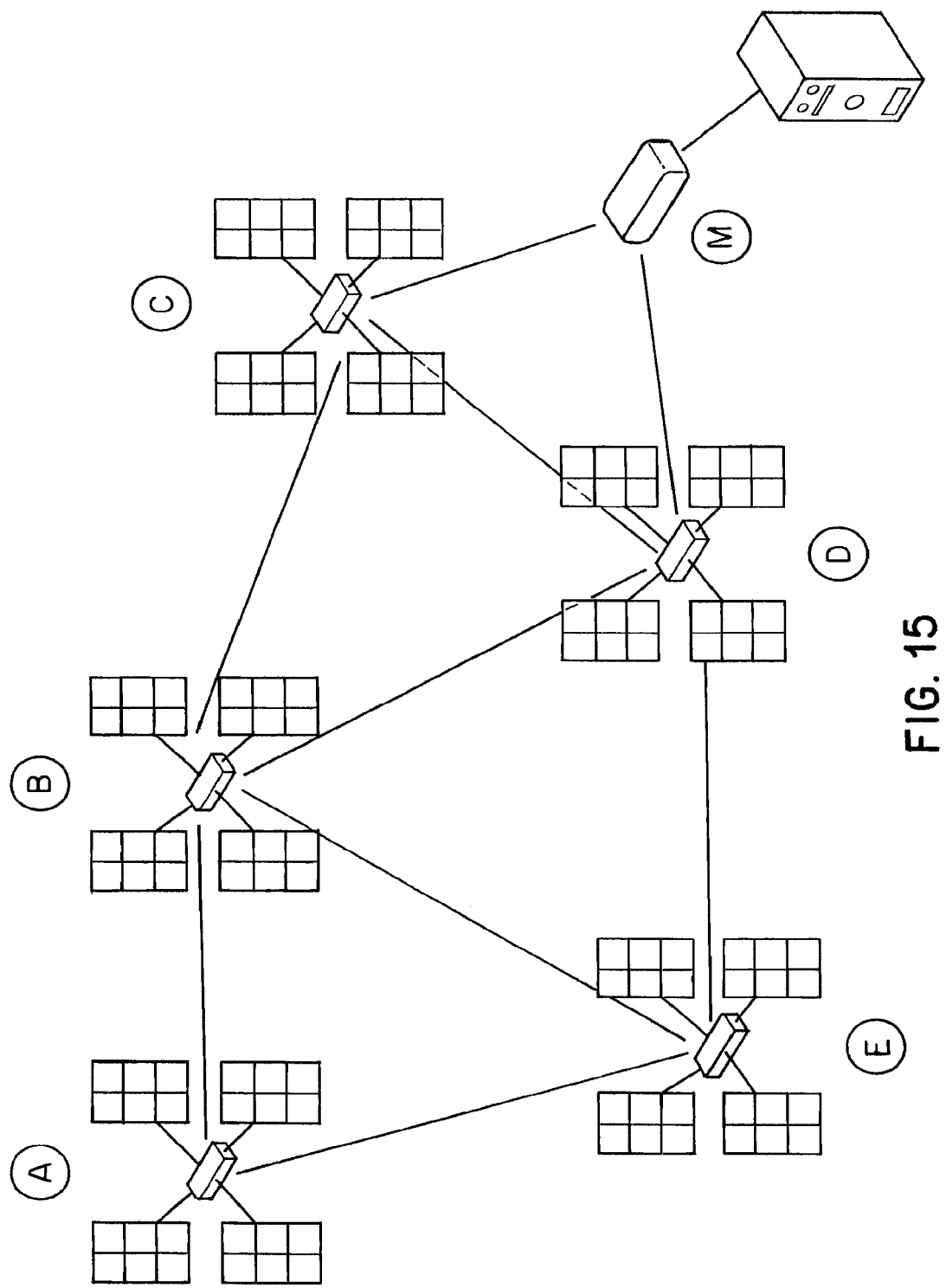
FIG. 15 shows five controllers each controlling twenty-four panes.

FIG. 15 shows 5 controllers each controlling 24 window/panes. These window panes may physically be aligned so that A and B are next to each other and E and D are directly below them. This would form an 8.times.12 pixel array. Commands from the MBCP will be sent via its local transmitter, M, into the wireless mesh network. Because of the mesh networking aspects of the controller network, if the MBCS is capable of communicating directly with controller D but finds it cannot directly communicate with controller B, it may route command data through node controller C to command B to set its pixels. To control the settings at node A, the command may for example go via the path M,D,E.A or M,D,B,A or M,C.B, A.

Figure 16:
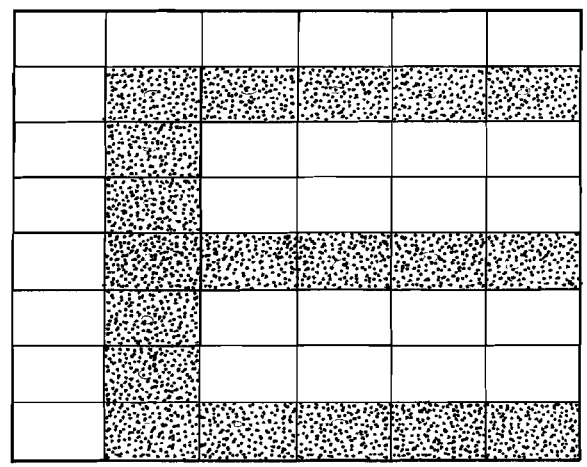
FIG. 16 shows the letter "E" formed by a 5 by 7 pixel array with a border.

FIG. 16 shows show the letter "E" formed in a 5 by 7 pixel array of darkened windows, with a border at the left and top having a width of a single window/pixel.

Figure 17:
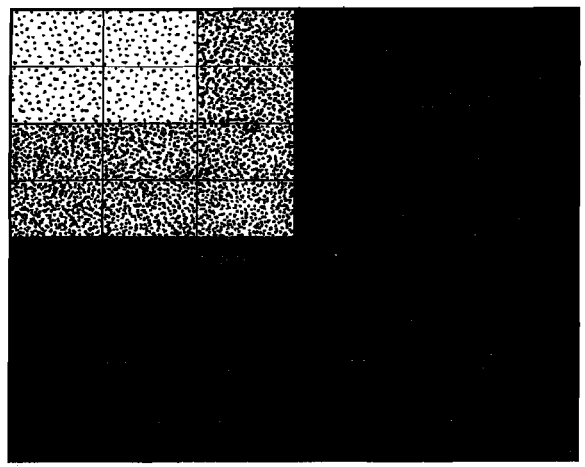
FIG. 17 shows a lighting effect in which each pane differs from its neighbor by a few percent.

FIG. 17 shows a lighting effect in which each pane differs from its neighbor by a few percent.

It will be appreciated that this invention provides for a range of SPD control far beyond that previously in existence. The "Scalable Controller" a.k.a. "SC" of this invention adds intelligence that greatly expands the capabilities of prior controllers. As in prior implementations, one to several pieces of glass may be controlled by a single controller, where several is a relatively small number such as eight and each piece of glass is hardwired to the controller. The Scalable controller further supports a set up phase whereby the user may configure the relationship between manual external control or several individual manual controls and which window/windows are to be controlled from that manual setting. In a setting of four windows under the Scalable Controller, where the windows are referred to as A, B, C and D, a user may configure the SC so that windows AB is controlled as a single window and CD as another, or ABC is controlled as a single window and D as another, or ABCD is controlled as a single window or, AB CD are controlled as 4 separate windows, as mentioned above in connection with FIG. 5.

Although such intelligent control permits several windows to operate autonomously, in a larger scale implementation, it is desirable to put entire segments of building windows under a coordinated set of controls. In relatively large types of environments, rather than using a profile of individual windows, it is possible to perform real-time data processing and make more intelligent decisions of the opacity of every segment of a building at any point in time. The SC of this invention is capable of expanding so as to operate in such a mode.

When the SC is in manual mode, it utilizes inputs from the room occupant to control the precise setting of the opaqueness of the SPD glass or plastic it is controlling. There is a range of different manual input devices that might be used. Switches, rheostat-like devices, or capacitance-type devices that have no moving parts but can sense the touch of a finger, for example, my all be utilized. But the SCs may also receive commands sent to it via a Local Area Network to which the is connected. The SC allows for the plug in of an LAN card so that it may receive commands from elsewhere in the network to control functions to be performed. Multiple LANs may be connected via Repeater/Bridges to increase the size of the physical area of building windows that is being covered. When the maximum length LAN has been reached, a router can be deployed to connect independent LANs to each other in the creation of a wide area network capable of reaching every SC in the building. The purpose of this wide area network is so that each SC may receive commands that are initiated from a central intelligence point, the Master Building Control Point (MBCP), where a data processing system is making decisions as to the optimal setting of each window. The MBCP is capable of taking in data from sensors that are collocated with SCs by polling for their data, and from other inputs that may be read through the network it is connected to, utilize latitude and longitude information, time of day, day of year, and other facts in order to make decisions how to optimally set the current opacity levels across the building. The MBCP may then send commands through the network to each individual window to select the optimal setting.

The Scalable Controllers may be equipped with various types of sensors that may be used in more finely controlling the energy usage in a building. A photocell may be placed onto each SPD glass and connected to its SC (see FIGS. 2 and 3). The Master Building Control Point "MBCP" may command all the SCs to periodically send sensor data to the MBCP or the MBCP may periodically poll each of the SCs to read photocell and other sensor data. Through an initial system configuration procedure at the MBCP, it is made aware of the configuration of the building, the compass direction in which windows face, the latitude and longitude of the building, the angle at which each window is from vertical, and the location of unique node and window addresses. Input from photocells throughout the building allow the MBCP to utilize voting techniques to determine the best areas of the building in which to increase or decrease opaqueness in order to reduce the overall building energy requirements for heating and air conditioning. If a readable compass and glass angle detector is installed at key SCs, the process of modeling the building to establish more precise control of each window, is simplified, by directly providing this configuration information.

In order to reduce the overall load on the backbone of the LANs and to allow commands to be executed truly simultaneously across the network, a hierarchy of Intelligent Control Points may be created. The control points could be nothing more than individual SCs that are commanded by the MBCP to act as relay stations on behalf of the MBCP. At the highest level of the hierarchy, the Master Building Control Point exists that makes intelligent decisions as to the current settings of opaqueness at all points in a building of SPD glass. Depending upon the size of the implementation, there are several levels of hierarchy. The Master Control Point sends opaqueness modification commands to one or more of the Hierarchical Control Points that in turn communicate with several lower level Hierarchical Control Points and eventually to each of the individual SCs for which it is responsible. Such a multi-level distribution of control reduces the volume of data packets traversing the LAN on which the Master Control Point exists and hands off the command distribution to each of the local LANs thus reducing the load on the Master and on the backbone network. It also allows for commands to be executed more quickly than if each had to be sent directly from the Master Control Point, since each Hierarchical Control Point is performing the distribution of commands for the Master on each of its local LANs. Therefore commands are sent simultaneously across multiple LANs instead of serially. This allows a very large number of Suspended Particle Devices to be changed more quickly and simultaneously.

In this instantiation of the invention, the MBCP will provide an XML interface (as shown in FIG. 13) to an external system to provide window tinting information and additional sensor data to the external system and to allow the external system to request adjustments to tinting levels around the building or adjust room lighting under its control. The MBCP takes requests from the XML link, interprets them and executes them by sending the proper commands through the Hierarchical network to effect the changes requested by the external Intelligent Energy Control System (IECS). When operating in this mode, the automated controls of the MBCP can be optionally bypassed, rather than using the derived information to command all windows to set in an optimal way. Instead, the commands are generated based upon the XML messages that are received from the IECS. A periodic "Heartbeat" transfer of XML command/responses over the MBCP/IECS link, insures that the two systems remain in sync and coordinating operations. In the event the heartbeat is lost, the MBCP can fall back to its automated mode and operate the building independently until the IECS system comes back online Optionally the MBCP can remain in direct control of window tinting providing the IECS with data to help augment its operations.

Figure 19:
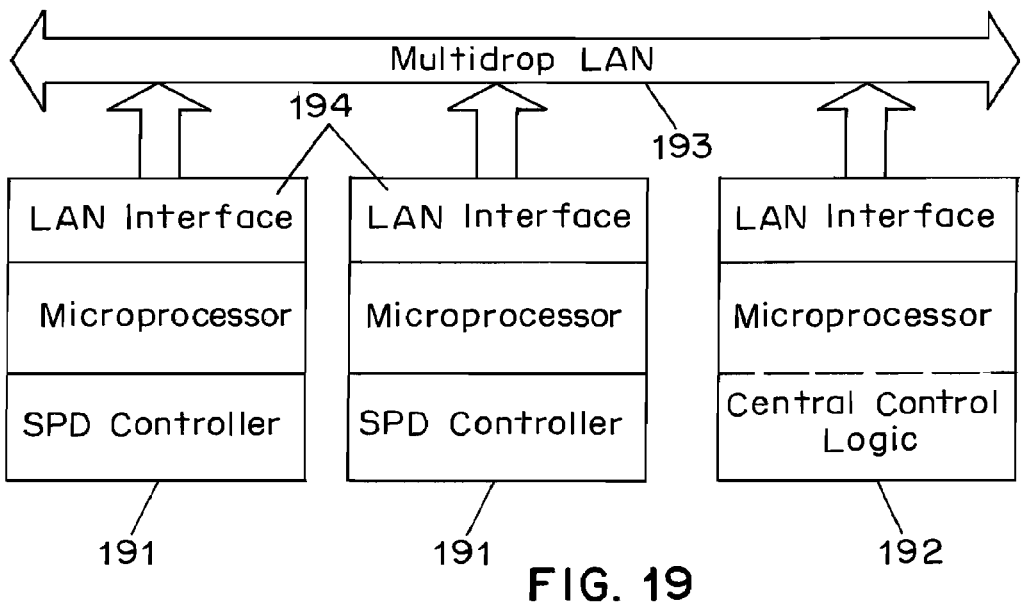
FIG. 19 shows two Scalable Controllers (SCs) consisting of the Intelligent Controller of FIG. 1 integrated with a LAN interface so that they can send packets of data to a Master Control Point (MCP) located on the LAN.

FIG. 19 shows two Scalable Controllers (SCs) 191, 192 consisting of the Intelligent Controller of FIG. 1 integrated with a LAN interface 194 so that they can send packets of data by means of a LAN 193 to a Master Control Point (MBCP) 192 located on the LAN.

Figure 20:
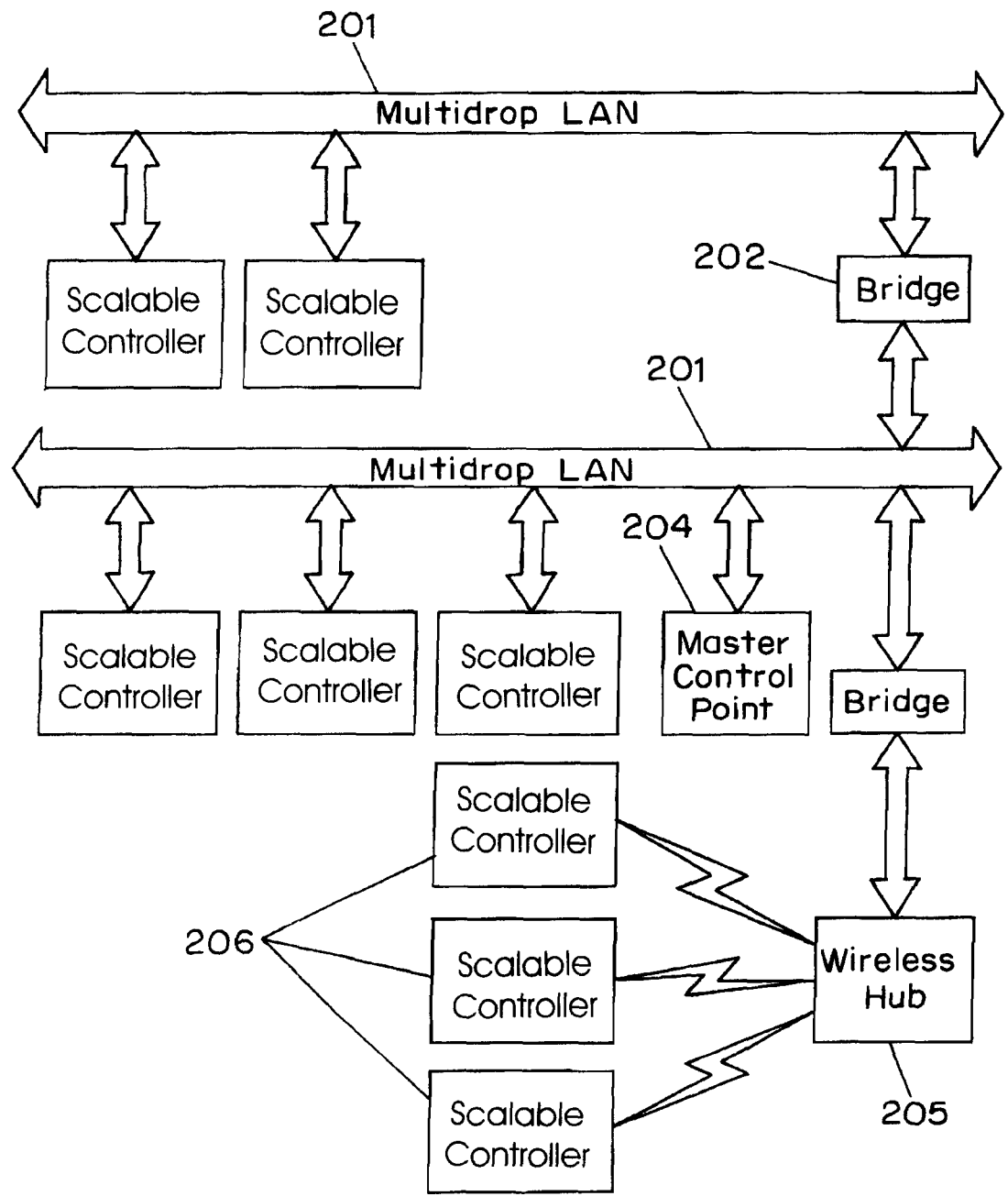
FIG. 20 shows that when LANs has reached its maximum capacity, due to cable length, a Bridge may be introduced in order to add another LAN segment to extend the size of the LAN.

FIG. 20 shows that when each of several LANs 201 has reached its maximum capacity, due to cable length of in this example, a Bridge 202 may be introduced in order to add another LAN segment to extend the size of the LAN. This would be the first method used in a structure to be employed to connect more controllers to a Master Building Control Point 204 which is controlling the settings of all of the SCs. This figure also depicts a Hub 205 which provides direct connectivity to individual SCs 206 rather than multiple SCs hanging off a shared wire. The connection between the Hub 205 and the individual SCs 206 may be wired or could be wireless. Using wireless LANs reduces the amount of building wiring that must be done to connect every Scalable Controller to the network that will provide connectivity to the Master Control Point 204 containing the building control logic.

Figure 21:
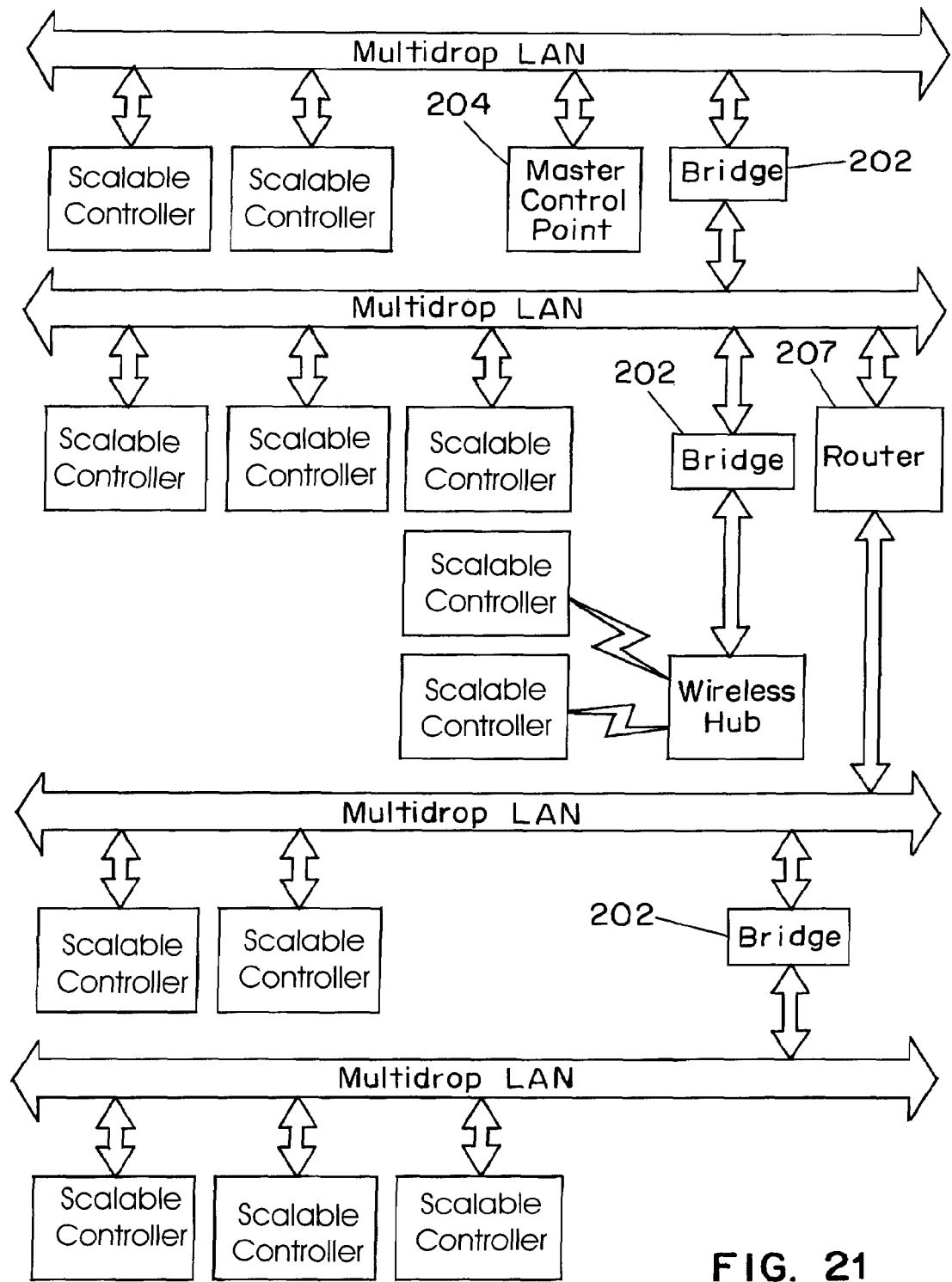
FIG. 21 shows how to further extend the size of a local network when the maximum number of LAN segments and Bridge/Repeaters has been deployed.

FIG. 21 shows how to further extend the size of a local network when the maximum number of LAN segments and Bridge/Repeaters 202 has been deployed. A Router component 207 is added which allows new and independent LAN segments to be connected to the Router 207. The Router 207 recognizes when data has been directed to a LAN address that is on a different LAN, and it then takes that data from the receiving LAN and resends it over the correct LAN where the destination address is located. Mapping tables tell the Router 207 what ranges of addresses each LAN handles. SCs located all over a large building are connected to the closest LAN in order to receive messages from the Master Building Control Point 204 located on the same or a remote LAN or from the Hierarchical Control Point located on the same LAN. This allows the MBCP to instantaneously change the opacity setting of any window in the building.

It will be appreciated that what has been described above greatly expands the Malvino patents in terms of scalability. But the SC also expands the basic functionality of the Malvino patents by providing a means of control of SPD far beyond that envisioned in those patents. The microprocessor-driven device can control the modulation of the voltage, setting of any desired operating frequency and/or setting of waveform characteristics to at least one suspended particle device (SPD) thereby controlling the light valve opacity characteristics of the device, as well as a means of manually controlling the modulating means where manual control information is read by the microprocessor and said microprocessor then adjusts modulating means based upon the setting of the manual control. There can be a plurality of manual control devices and/or a plurality of individual SPDs hardwired to the microprocessor driven device. There can be a setup procedure where the relationship between which one of a plurality of manual control devices is to be used to directly control the SPD opacity of one or more of a plurality of hardwired SPDs so as to act as if it is a single SPD. There can be a means of externally controlling the modulating means through digital commands received over a communications channel. There can be a radio transmitter and receiver, using point-to-point radio communications to transmit and receive data at neighboring microprocessor driven devices, where remote radio receiving device interprets the header of a packet of data sent by the transmitting device and only processes the receiving data if necessary as determined from the packet header data. If the header data at the receiving microprocessor specifies that said receive data is meant for a different microprocessor driven device that is not directly in communication with the receiving device, the receiving device shall resend the data packet toward another microprocessor driven device or node, by consulting an on-board dynamically updated Routing Table to send the data further along in the aforementioned network via additional intermediate hopping points. Once said packet of data reaches its final destination point, it is processed by application software at that final destination.

Many different types of packets may be sent through the network, some of which are used to maintain the network itself, others which move statistical data through the network and others which move application data such as Light Valve commands, through the network. One type of network packet may distribute instantaneous routing information that will be used at each node to assist in the determination of the best next route to be used to move this packet toward the destination node. Another type of packet will contain SPD Glass control command for a remote node, asking the remote node to change the local Light Valve to a particular setting.

The system may incorporate an interface to a Local Area Network (LAN) to connect a Master Building Control Point, a microprocessor-driven device which makes intelligent decisions regarding what opaqueness should be set at an individual window, and sends commands to other parts of the system over the LAN. The LAN may be wired via Thinnet, Thicknet, twisted pair, optical fiber or other wired LAN means, or wireless using any variant of IEEE 802.11, or IEEE 802.15 or other wireless LAN means. The LAN may be bridged to another LAN to extend restrictions on bus length or the number of devices connected to one bus. The LAN may be extended using a router in order to connect to other LANs over a much larger area of a residential or commercial building that can be reached by a single LAN in order to communicate with the Master Building Control Point attached to the local or wider area network.

The controller may run a particular set of software that enables it to perform its normal functions in addition to becoming an "Intelligent Control Point" on the LAN referred to as the Hierarchical Control Point. This device is capable of communicating with every one of the devices in a hierarchy.

The system may automatically change the Light Valves under its control, based upon the physical orientation of the SPD on the earth, the latitude and longitude of the SPD, the day of the year and the time of the day. The microprocessor will support a profile of data which is derived from off-line processing of the orientation of the window in space at every moment of the year so that optimal Light Valve settings may continuously be made in order to reduce energy utilization in residential and commercial environments using window based SPDs.

If manual override operations are used to override automated operations, after a specific period of time automated operations may resume. Automated operations may be resumed when a room occupancy sensor does not show any movement in a room for a specific period of time. The system may support a small number of fixed profiles for daytime and night time opacity settings and a switch to manually set which profile is currently in effect. There may be two profiles and the manual switch may be labeled Summer and Winter. There may be four profiles and the manual switch is labeled Summer, Fall, Winter and Spring.

In the system, optimal Light Valve settings may be derived in real time in lieu of using a predetermined profile of information. Such real-time calculations might be performed at the Master Building Control Point.

A device comprising the same electronics as a controller that operates an SPD may not connected to any SPD but may only be used as an intermediate hopping point to move data between other fully SPD operational devices, utilized in spots where radio coverage is poor where fully operational devices are unable to communicate directly with each other. This hopping-point device may be placed in an otherwise dead spot between other devices, to act as a bridge between the other devices.

In the system, messages may flow through a hierarchy of specialized nodes and not from any node to any other node in the network. At the highest level of the hierarchy, a Control Point exists that makes intelligent decisions as to the current settings of opaqueness at all points in a building of SPD glass. Depending upon the size of the implementation, there are several levels of hierarchy. One of these Building Control Points communicates several lower level control points so that each may simultaneously act upon the command to modify the Light Valve setting at a controller. The lower level control point may further distribute the command to another lower level of control points to further spread the command to the largest number of points in the quickest time so that the windows may be activated as quickly as possible.

In the system, messages may flow through a hierarchy of Intelligent Control Points located on the same or different LANs than the Master Control Point. At the highest level of the hierarchy, a Control Point exists that makes intelligent decisions as to the current settings of opacity at all points in a building of SPD glass. Depending upon the size of the implementation, there are several levels of hierarchy. The Master Control Point sends opacity modification commands to one or more of the Hierarchical Control Points which in turn communicate with several lower level Hierarchical Control Points and eventually to each of the individual controllers within its realm of control. Such a multi-level distribution of control reduces the volume of data packets traversing the LAN on which the Master Control Point exists and hands off the command distribution to each of the local LANs thus reducing the load on the Master and on the backbone network. It also allows for commands to be executed more quickly than if each had to be sent directly from the Master Control Point, since each Hierarchical Control Point is performing the distribution of commands for the Master on each of its local LANs. Therefore commands are sent simultaneously across multiple LANs instead of serially. This allows a very large number of Suspended Particle Devices to be changed more quickly and simultaneously.

The SC may modulate the frequency across a variable range, occurring simultaneously with the varying of Voltage driving the SPD. Driving the device over a variable frequency can eliminate a potential for the glass to "sing" (generating an audio tone) that would otherwise annoy human individuals in the same room.

A scalable controller may include a sensor circuit to detect a drop in the current flow through the SPD. This would be indicative of a breakage in the SPD. In this event the SC sends the MBCP a "glass breakage detection" message to denote the event. The MBCP in receiving the alarm is capable of determining which window this came from and will request human intervention through any of a number of different means. This might include one or more radio paging messages sent over the Internet, a short message for one or more cell phones sent over the Internet, calling a central station monitoring facility and generating a synthetic voice message, sending a message over the Internet to a monitoring service specifically overseeing the SPD-glass building control, among other means. The MBCP maintain hysteresis logic so that if flooded with breakage detection messages at any one time, multiple alerts are not generated, unless they are not responded to in a given period of time. The MBCP is capable of turning off the glass-breakage detection logic at an SC for any period of time, so as to avoid being flooded with messages from entire sections of the building, after the alert has been acknowledged.

For all SPD applications including automotive, marine, aerospace and architectural, the controller of this invention can drive the SPD in more sophisticated ways than in the Malvino patents.

First, various waveforms can be used rather than a single waveform.

Second, the duty cycle can be varied, to conserve energy.

Within the controller, two or more electro-optical lookup tables can be stored to support multiple types of SPD.

The manner of driving the SPD can be adjusted based upon external temperature.

And, power can be dynamically managed to optimize power consumption.

The Malvino U.S. Pat. Nos. 6,897,997 and 6,804,040 provided for a basic method of driving SPD based material so that it changes from its clear to dark state or to various levels of opacity in between. These basic patents do not address the full operational parameters of SPD or their control. The microprocessor-centric SC provides for an unprecedented level of fine and optimized control of SPD through several methodologies, algorithms and feedback mechanisms that this enhanced controller patent describes.

The Malvino '997 and '040 patents were concerned with the creation of some set of electronics that would allow SPD-based material to change state. But detailed studies of the nature of SPD reveals that there are several features of SPD other than opacity that must be taken into account to properly control SPD-based windows. And there are many variable factors which control these features.

The main feature of SPD is in its ability to move from a clear state to a dark state and back again or to any intermediate opacity level, based upon the frequency and AC voltage level applied. But other important features to control are switching time, haze, clarity, possible singing or humming of the SPD laminated between two pieces of glass or plastic, and power consumption. There are many parameters whose settings affect these features. These are AC voltage, frequency, frequency tolerance, temperature, wave form, wave phase, duty cycle, thickness of the SPD, the manufacturer of the SPD and sometimes which production run itself within one manufacturer. The simple circuits of the Malvino U.S. Pat. Nos. 6,897, 997 and 6,804,040 are incapable of factoring in all of these parameters to provide the desired performance of the SPD.

Different applications of SPD will require optimization of some manner of operating a SC. In building applications that are targeted at energy efficiency the SC will emphasize those functions aimed at energy conservation. Switching speed would be traded off for energy efficiency. In an automobile the vendor may wish opacity changing time, also referred to as glass switching time or glass switching speed, to remain constant regardless of the exterior temperature of the vehicle. The SC can insure a lower switching speed by driving the SPDs at a higher frequency when the outdoor temperature is very low at the expense of utilizing more power.

Figure 24:
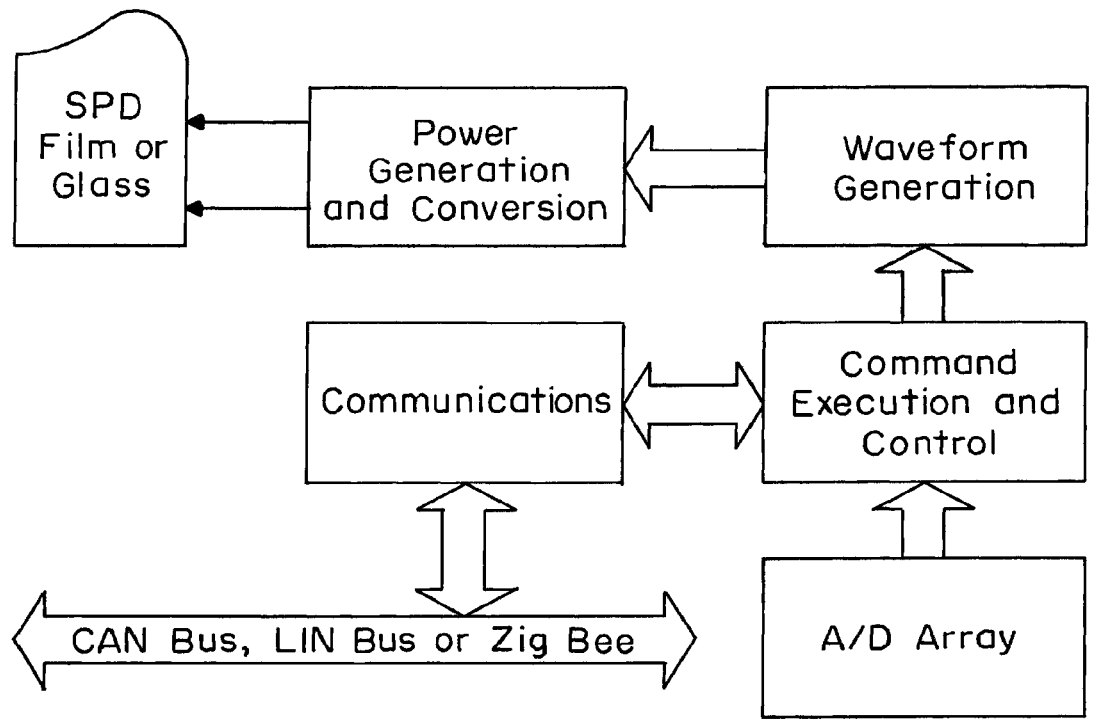
FIG. 24 shows the major subsections which comprise the Scalable Controller.

FIG. 24 shows the logical structure of an embodiment of the invention. This is an enhanced controller not only in its ability to become part of a larger coordinated network of controllers, but it the enhanced intelligence of each individual node in its control of SPD.

The Command and Control portion of the controller receives commands from an external source (such as an optional A/D type device like a dimmer switch for example) or other microprocessors over a communications link, to set the light opacity level of SPD Glass to a particular level. The SC may utilize sensors through its A/D interface to determine the external temperature to take this into account to optimize either switching time or power consumption, whichever is of more importance to the user. A particular shape wave form is set up by the wave generation logic which modulates the required amount of power at the optimal frequency to switch the glass. To reduce the power being utilized to maintain the SPD at a particular opacity level, the duty cycle of the waveform utilized is reduced. Algorithms built into the software of the SC take into account the goal which is to be achieved and adjust the setting of the factors mentioned to provide the desired goal. The SC has full flexibility to adjust all performance affecting parameters in a particular environment.

Figure 25:
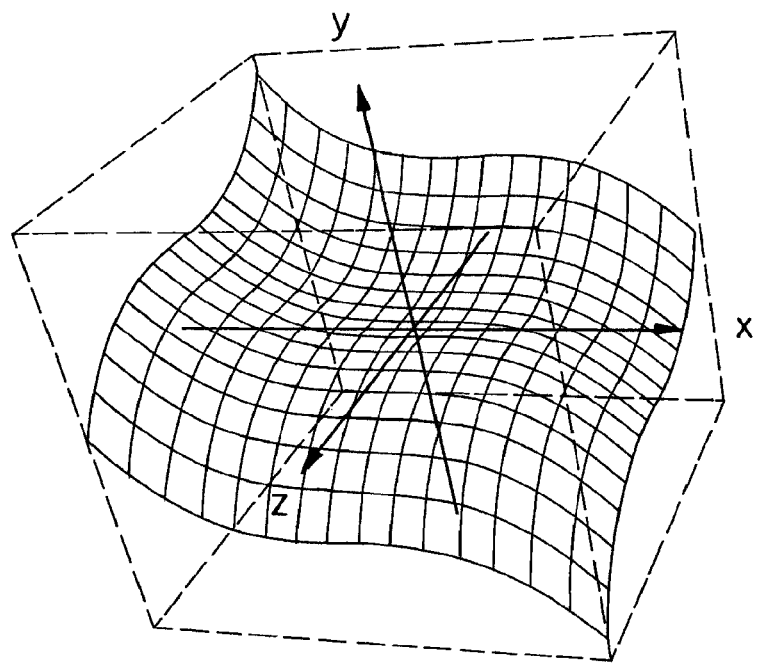
FIG. 25 shows one of the typical three-dimensional tables of data that is programmed into the controller to operate it. Such table provide information on the interaction of three variables that together control the operation of SPD based glass.

The controller has a series of internal 3-dimensional tables similar to FIG. 25, which map various operational parameters against others in order to know how the changing of one factor or two factors will affect the third. For example, the table might define the proper voltage and frequency required for absolute levels of light transmission. Another such table would describe the relationship between switching time and frequency for a given amount of power. A third table would provide a model of switching time and frequency for a given temperature. A fourth table would evaluate switching time and frequency for a given temperature.

Using algorithms built into the intelligent controller it may make trade-offs to optimally operate SPD according to the goals that are programmed into its memory. If the maintenance of switching time at less than 2 seconds from dark to clear is desired, then these algorithms will pull data from these tables to increase the frequency of the AC signal, increase the voltage and provide extra power in order to provide a specific level of opacity for a particular manufacturer's SPD. If in another instance, power consumption was the factor for optimization, the SC would operate the SPD at a lower frequency and adjust the voltage accordingly in order to achieve absolute levels of opacity, where the reduced power consumption would be at the expense of a switching speed of perhaps 8 seconds instead of 2.

This data is repeated for each manufacturer of SPDs so that the controller may make proper decisions based upon the particular SPD being utilized. There may be a day when industry standardization will insure that all SPD reacts in exactly the same repeatable way across manufacturers and across production runs from one manufacture, but until the industry can achieve this level of quality control across different manufacturing processes, multiple tables which model performance must be preprogrammed into the tables of the controller. But the end result is that the controller is a universal controller for all SPD applications.

The set of tables stored in the controller are typically created off-line through laboratory experimentation of each manufacturer's SPD. The resultant data is stored in the tables of the controller or may be downloaded into the controller over its communication channel.

In some implementations of the controller some of the three-dimensional tables will be collapsed to two dimensions as the third factor is not one measured or under the control of the particular model of controller. For example, a basic model of controller may not utilize a temperature sensor and will operate continually under the assumption of a fixed operating temperature. One of the sets of tables in the controller is known as the EO (Electro-Optical) table. This table is ordered by opacity at 0% (dark) to 100% (clear). Each entry contains the optimal frequency and voltage to set a particular manufacturer's glass to the given opacity level. If temperature is not going to be considered in the operation of this version of the controller, the EO table remains two-dimensional.

In addition to using its algorithms and internal tables to set the various parameters to control the SPD, the controller can dynamically change its parameter settings based upon measurement and feedback from sensors connected to its A/D inputs. For example, a light source and photocell or phototransistor or other photodetector may be used to shine a specific intensity light through the changing SPD and to a photocell which will detect the actual light level. The EO table being used to switch the SPD to a particular opacity level may not have a temperature component in its entry. But the controller can measure actual switching time by measuring how long it takes for the glass to reach the opacity level requested, because its light/photocell logic can measure when the actual opacity level has been achieved. Knowing the time, the controller algorithms can determine a better frequency and voltage to operate the glass to reduce the switching time to the desired level. The measuring devices are used in the creation of a feedback loop to auto-adjust operational parameters.

The intelligent controller is able to further reduce the amount of power consumption of SPD to values lower than that achieved by operating the SPD at an optimal frequency and voltage for a given opacity level at a given temperature. The controller may change the duty cycle of the power output to not keep the SPD under constant AC power. Logic in the controller can reduce the number of complete wave form cycles being generated over a given period of time. So if 'm' cycles would normally occur in time 't', every other cycle could be ignored and power shut down in those cycles, to achieve a 50% duty factor. In general the goal is to only keep the power operating only 'n' out of every 'm' cycles in order to reduce power. At some point there will be a visible flickering of the SPD noticed. Experimentation derives another three-dimensional table which specifies the lowest allowable duty cycle for a given opacity level against a third parameter such as operating temperature.

Experimentation and an analysis of the three-dimensional graphs of operational parameters and their resulting features, reveal other mixed operating modes by taking advantage of aspects of different graphs. Reasonable switching speeds of 2 seconds dark to clear at room temperature can be achieved at 60 Hz and 20-100 volts AC. More optimal energy performance is achieved below 60 Hz, perhaps better at 30 Hz, without causing flickering in the SPD. Higher frequencies (400 Hz) can switch the SPD much faster but use more power to effect the switching. The controller takes advantage of these factors when optimizing for switching speed by shifting to a higher frequency during the transition from one opacity level to another then reducing the frequency to the lower allowable range to maintain the opacity setting at low power.

It will be appreciated that one skilled in the relevant art may readily devise myriad obvious variants and improvements upon the invention without undue experimentation, none of which depart in any way from the invention and all of which are intended to be encompassed within the claims which follow.

The invention claimed is:

1. A controller controlling the opacity of a multiplicity of SPDs placed in a vertical array one above another so as to form a window pane, wherein each SPD acts as a pixel in a display, the controller having further input means to specify a desired opacity value,
the controller having further means to derive a specific opacity value for each SPD pixel derived from the desired opacity value and the vertical position of the individual SPD pixel and sets each SPD pixel to the specific opacity value for the specific individual SPD pixel and
wherein the desired opacity value received from the input means increases from 0% to 100% opacity or from a starting opacity value toward a higher opacity value and
whereby the derived specific opacity value set for each individual SPD pixel as the desired opacity increases, is such that the derived specific opacity value for each SPD pixel is greater than or equal to the derived specific opacity value of the SPD below it, resulting in a visual effect of a window shade being pulled down from the top, where the top of the window pane darkens quicker than the window pane area below it or
whereby the derived specific opacity value set for each individual SPD pixel as the desired opacity increases, is such that the derived specific opacity value for each SPD pixel is less than or equal to the derived specific opacity value of the SPD below it, resulting in a visual effect of a window shade being pulled up from the bottom, where the bottom of the window pane darkens quicker than the window pane area above it.

2. The controller of claim 1 in which the multiple SPD pixels placed vertically above each other are installed in the top of the front windshield of a car, truck, bus, RV, train, aircraft or other vehicle where it is used as a variable visor where each SPD pixel blocks a portion of light.

3. The controller of claim 1 in which the multiplicity of SPD pixels placed vertically are installed in the top of the front windshield of a car, truck, bus, RV, train, aircraft or other vehicle where it is used to provide the effect of a window shade being pulled down from the top or up from the bottom as light is blocked by the opacity of each SPD pixel.

4. The controller of claim 1 in which the multiple SPD pixels placed vertically above each other form a window pane that is installed into a car, truck, bus, RV, train, aircraft or other vehicle where it is used to provide the effect of a window shade being pulled down from the top or up from the bottom as light is blocked by the opacity of each SPD pixel.

5. The controller of claim 1 in which the input means is a rotary dial, a touch sensitive device, a touch screen, a button, a tablet, a smartphone, a communications channel over which a message is sent to set the desired opacity to a specific value, a photo-sensor, a temperature sensor, or a radio channel carrying a message specifying the desired opacity.

6. The controller of claim 1 in which the multiple SPD pixels placed vertically above each other forms a window pane that is installed into a car, truck, bus, RV, train, aircraft or other vehicle where it is used as a variable visor where each SPD pixel blocks a portion of light.

7. A multiplicity of controllers each controlling at least one SPD and communicatively coupled to each other and controlling the opacity of their respected at least one SPD which is placed in a vertical array one above another so as to form a window pane, wherein each SPD acts as a pixel in a display, at least one of the multiplicity of controllers having further input means to specify a desired opacity value and communicating such value to the multiplicity of controllers so that they each may derive a specific opacity for their respected at least one SPD derived from the desired opacity value and the vertical position of the individual SPD pixel and sets their respected at least one SPD to the specific opacity value for the specific individual SPD pixel.

8. The controllers of claim 7 in which the derived specific opacity value for a SPD pixel is greater than or equal to the derived specific opacity value of the SPD below it.

9. The controllers of claim 8 in which the desired opacity value increases from 0% opacity to 100% opacity and whereby the derived specific opacity value set for each individual SPD pixel as the desired opacity changes, results in a visual effect of a window shade being pulled down, where the top of the window pane darkens quicker than the window pane area below it.

10. The controllers of claim 7 in which the derived specific opacity value for a SPD pixel is less than or equal to the derived specific opacity value of the SPD below it.

11. The controllers of claim 10 in which the desired opacity value increases from 0% opacity to 100% opacity and whereby the derived specific opacity value set for each individual SPD pixel as the desired opacity changes, results in a visual effect of a window shade being pulled up from the bottom, where the bottom of the window pane darkens quicker than the window pane area below it.

12. A method for use with a controller controlling the opacity of a multiplicity of SPDs placed in a vertical array one above another so as to form a window pane, wherein each SPD acts as a pixel in a display, comprising the steps of:
the controller specifying a desired opacity value through an input means,
the controller deriving a specific opacity value for each SPD pixel derived from the desired opacity value and the vertical position of the individual SPD pixel and setting each SPD pixel to the specific opacity value for the specific individual SPD pixel and
wherein the desired opacity value received from the input means increases from 0% to 100% opacity or from a starting opacity value toward a higher opacity value and
whereby the derived specific opacity value set for each individual SPD pixel as the desired opacity increases, is such that the derived specific opacity value for each SPD pixel is greater than or equal to the derived specific opacity value of the SPD below it, resulting in a visual effect of a window shade being pulled down from the top, where the top of the window pane darkens quicker than the window pane area below it or
whereby the derived specific opacity value set for each individual SPD pixel as the desired opacity increases, is such that the derived specific opacity value for each SPD pixel is less than or equal to the derived specific opacity value of the SPD below it, resulting in a visual effect of a window shade being pulled up from the bottom, where the bottom of the window pane darkens quicker than the window pane area above it.

13. A method for use with a system having a multiplicity of controllers communicatively coupled to each other comprising the steps of:
each of the multiplicity of controllers controlling at least one SPD;
each of the multiplicity of controllers controlling the opacity of their respected at least one SPD which is placed in a vertical array one above another so as to form a window pane, wherein each SPD acts as a pixel in a display;

at least one of the multiplicity of controllers having an input means specifying a desired opacity value and communicating such value to the multiplicity of controllers;

each of the multiplicity of controllers deriving a specific opacity for its respected at least one SPD through a combination of the desired opacity and knowing the vertical position of its respected at least one SPD; and each of the multiplicity of controllers setting its respected at least one SPD to the specific opacity value for the specific individual SPD pixel.

* * * * *